United States Patent
Xu et al.

(10) Patent No.: US 12,510,460 B2
(45) Date of Patent: Dec. 30, 2025

(54) METHOD AND APPARATUS FOR ANALYZING FLOW MATRIX DATA, AND COMPUTER DEVICE

(71) Applicant: Hangzhou ShineDo Biotech. Co.Ltd., Hangzhou (CN)

(72) Inventors: Yu Xu, Hangzhou (CN); Zhiyuan Ma, Hangzhou (CN); Xin Li, Hangzhou (CN); Jianqiu Fang, Hangzhou (CN); Chunmei Zhong, Hangzhou (CN)

(73) Assignee: HANGZHOU SHINEDO BIOTECH. CO.LTD., Zhejiang (CN)

( * ) Notice: Subject to any disclaimer, the term of this patent is extended or adjusted under 35 U.S.C. 154(b) by 362 days.

(21) Appl. No.: 18/185,802

(22) Filed: Mar. 17, 2023

(65) Prior Publication Data

US 2024/0192117 A1    Jun. 13, 2024

(30) Foreign Application Priority Data

Dec. 22, 2022   (CN) .......................... 202211659705.5

(51) Int. Cl.
*G01N 15/1433* (2024.01)
*G01N 15/10* (2024.01)

(52) U.S. Cl.
CPC ..... *G01N 15/1433* (2024.01); *G01N 15/1012* (2013.01); *G01N 2015/1016* (2024.01)

(58) Field of Classification Search
None
See application file for complete search history.

(56) References Cited

U.S. PATENT DOCUMENTS

| 4,661,913 | A | * | 4/1987 | Wu | G06V 20/698 |
|---|---|---|---|---|---|
| | | | | | 436/63 |
| 2012/0245889 | A1 | * | 9/2012 | Zhu | G01N 33/4915 |
| | | | | | 702/181 |
| 2014/0343897 | A1 | * | 11/2014 | Trotter | G06V 10/457 |
| | | | | | 702/189 |

* cited by examiner

*Primary Examiner* — Miya J Cato
(74) *Attorney, Agent, or Firm* — MUNCY, GEISSLER, OLDS & LOWE, P.C.

(57) ABSTRACT

A method for analyzing flow matrix data includes: acquiring and sampling a forward-scattered light pulse signal outputted by a flow matrix analyzer and a plurality of fluorescence pulse signals; performing fluorescence compensation on three pieces of fluorescence pulse data after the sampling, and mapping true data of two classification fluorescence pulses to a scatter plot so as to form a two-dimensional array; converting the two-dimensional array into a binary image, and constructing an ellipse gate related to the gathering region; obtaining intrinsic characteristics and movement characteristics of the ellipse gate; and obtaining coordinates of two focuses on the ellipse gate; calculating a distance between each microsphere particle and the two focuses on each ellipse gate; and calculating a median value of true data of calibration fluorescence pulses on all microsphere particles.

21 Claims, 11 Drawing Sheets

METHOD AND APPARATUS FOR ANALYZING FLOW MATRIX DATA, AND COMPUTER DEVICE

TECHNICAL FIELD

The present invention relates to the field of immunology technologies, and in particular to a method and apparatus for analyzing flow matrix data, and a computer device.

BACKGROUND OF THE INVENTION

Flow matrix analyzer is a high-tech equipment integrating laser technology, electronic physics technology, electronic computer technology, fluorescence chemistry technology and antigen antibody detection technology. The flow matrix analyzer measures various biophysical properties of particles by detecting fluorescence pulse signals specifically labeled with microsphere particles specificity.

The current flow matrix analyzer is mainly based on the detection of fluorescence pulse signal, and the analysis methods for the detected signals are very simple. For example, usually, the qualitative analysis of the test samples can only be performed in the form of charts for negative and positive determinations and the like. Obviously, those qualitative analysis methods cannot meet the needs of current medical detection. Although some analyzers capable of performing quantitative analysis have appeared on the market, these analyzers not only have problems such as cumbersome analysis steps and long analysis time, but also requires the threshold set manually during analysis, where the threshold is greatly affected by human subjectivity. This affects the accuracy of quantitative analysis to an extent. In this case, this method of manually setting the threshold also has the problem of poor quantitative accuracy due to the fixed position in each measurement. In addition, in the existing multicolor fluorescent flow matrix analyzer, each fluorescein needs to be detected by a detector with a corresponding wavelength. However, due to the normal distribution of the wavelengths emitted by fluorescein in a wide range, a fluorescence wavelength partially leaks into other detectors, which causes mutual interference of fluorescences, thus affecting the accuracy of the analysis of the detection results.

SUMMARY OF THE INVENTION

To overcome the deficiency of prior art, the present invention provides a method and apparatus for analyzing flow matrix data, and a computer device, which are capable of performing quantitative analysis with high accuracy.

To achieve the foregoing objective, the present invention provides a method for analyzing flow matrix data, including:
  acquiring and sampling a forward-scattered light pulse signal outputted by a flow matrix analyzer and fluorescence pulse signals emitted by two classification fluoresceins used for microsphere classification and a calibration fluorescein;
  performing fluorescence compensation on three pieces of fluorescence pulse data after the sampling so as to obtain true data of each fluorescence pulse, and mapping true data of two classification fluorescence pulses to a scatter plot so as to form a two-dimensional array;
  converting the two-dimensional array into a binary image, constructing, based on a gathering region of each microsphere particle on the binary image, an ellipse gate related to the gathering region, and obtaining intrinsic characteristics and movement characteristics of the ellipse gate, where this step includes: segmenting the formed binary image to obtain a connection domain in which each microsphere particle gathers; obtaining a relevant ellipse gate parameter based on an edge of the connection domain; and inversely converting the obtained ellipse gate parameter of each microsphere particle into a coordinate system corresponding to the two-dimensional array so as to obtain corresponding ellipse gate characteristics, where the ellipse gate characteristics include the intrinsic characteristic representing an ellipse gate size and the movement characteristic representing a transform from a standard position to the ellipse gate;
  obtaining coordinates of two focuses on the ellipse gate based on the intrinsic characteristics and movement characteristics of each ellipse gate;
  obtaining the true data of two classification fluorescence pulses acquired on each microsphere particle so as to form coordinates of the microsphere particle, and comparing a relationship between distances from coordinates of each microsphere particle to the two focuses on each ellipse gate and a major axis of the ellipse gate so as to classify the microsphere particle into a corresponding ellipse gate; and
  calculating a median value of true data of calibration fluorescence pulses on all microsphere particles within each ellipse gate for calibration or qualification.

According to an embodiment of the present invention, the obtaining a relevant ellipse gate parameter based on an edge of the connection domain includes:
  constructing a minimum bounding rectangle of the connection domain based on a boundary of the connection domain, and obtaining coordinates of a center point of the minimum bounding rectangle and a deflection angle of the bounding rectangle with respect to a binary image abscissa; and
  determining an inscribed ellipse of the minimum bounding rectangle based on the deflection angle and coordinates of the center point of the minimum bounding rectangle, and obtaining corresponding ellipse parameters, where the ellipse parameters include coordinates of a center point of the ellipse, coordinates of a boundary point on a major axis of the ellipse, coordinates of a boundary point on a minor axis of the ellipse, and a deflection angle of the major axis of the ellipse with respect to a binary image abscissa.

According to an embodiment of the present invention, when gathering regions of various microsphere particles are regularly arranged in rows or columns, the segmenting the formed binary image to obtain a connection domain in which each microsphere particle gathers includes:
  projecting the binary image along a direction perpendicular to coordinate axes so as to form a one-dimensional projection histogram;
  performing gaussian smoothing on the one-dimensional projection histogram, and calculating a trough position of each histogram;
  performing segmentation based on the trough position so as to obtain a row gathering block or a column gathering block;
  establishing a structural element so as to expand and corrode each row gathering block or column gathering block a plurality of times; and
  determining, based on a spacing between pixels, the connection domain in which each microsphere particle gathers after the corrosion, and removing interference.

According to an embodiment of the present invention, the segmenting the formed binary image to obtain a connection domain in which each microsphere particle gathers includes:
    establishing a structural element so as to expand and corrode the gathering regions of all microsphere particles on the binary image a plurality of times; and
    determining, based on a spacing between pixels, the connection domain in which each microsphere particle gathers after the corrosion, and removing interference.

According to an embodiment of the present invention, after the connection domain of each microsphere particle is determined, a connection domain area is calculated and the connection domain area is compared with a preset connection-domain area threshold; and if the connection domain area is greater than twice the preset connection-domain area threshold, it is indicated that current detection is abnormal.

According to an embodiment of the present invention, before the fluorescence compensation, the method for analyzing flow matrix data further includes:
    displaying data of the sampled forward-scattered light pulse signal in a form of histogram, and determining, based on a preset binary gate related to a microsphere size, whether a forward-scattered light pulse is located inside the binary gate; and performing the fluorescence compensation if the forward-scattered light pulse is located inside the binary gate.

According to an embodiment of the present invention, the intrinsic characteristics of the ellipse gate include coordinates of a center point, a semi-major axis, and a semi-minor axis that are of the ellipse gate, and the movement characteristics of the ellipse gate include an angle being θ between a major axis and an abscissa as well as a translation vector from a coordinate origin to an ellipse center point; and
    the obtaining coordinates of two focuses on the ellipse gate based on the intrinsic characteristics and movement characteristics of each ellipse gate includes:
    constructing, based on the semi-major axis and the semi-minor axis in the intrinsic characteristics of the ellipse gate, a standard ellipse gate, corresponding to the ellipse gate, whose center point is at the coordinate origin; and obtaining two focuses of the standard ellipse gate;
    rotating the two focuses of the standard ellipse gate by the angle θ in the movement characteristics; and
    translating the two rotated focuses based on a translation vector from the coordinate origin to the ellipse center point, to obtain the two focuses of the ellipse gate.

According to an embodiment of the present invention, the two fluoresceins used for microsphere classification are FITC and PerCP respectively, the calibration fluorescein is PE, and the performing fluorescence compensation on three pieces of fluorescence pulse data after sampling includes:
    obtaining a preset fluorescence spillover matrix value as follows related to a selected fluorescein type and a detector:

$$\begin{bmatrix} & FITC & PE & PERCP \\ FITC & OM_{ff} & OM_{fp} & OM_{fpcp} \\ PE & OM_{pf} & OM_{pp} & OM_{ppcp} \\ PERCP & OM_{pcpf} & OM_{pcpp} & OM_{pcppcp} \end{bmatrix}$$

calculating a fluorescence compensation array value as follows according to the spillover matrix value:

$$\left( \begin{bmatrix} OM_{ff} & OM_{fp} & OM_{fpcp} \\ OM_{pf} & OM_{pp} & OM_{ppcp} \\ OM_{pcpf} & OM_{pcpp} & OM_{pcppcp} \end{bmatrix}^T \right)^{-1}$$

and
    calculating the true value of the fluorescence pulse data after the compensation based on the following fluorescence compensation formula:

$$\begin{bmatrix} FITC_{true} \\ PE_{true} \\ PERCP_{true} \end{bmatrix} = \left( \begin{bmatrix} OM_{ff} & OM_{fp} & OM_{fpcp} \\ OM_{pf} & OM_{pp} & OM_{ppcp} \\ OM_{pcpf} & OM_{pcpp} & OM_{pcppcp} \end{bmatrix}^T \right)^{-1} \times \begin{bmatrix} FITC_{detection} \\ PE_{detection} \\ PERCP_{detection} \end{bmatrix}$$

where $FITC_{detection}$, $PE_{detection}$, and $PerCP_{detection}$ are data of the acquired fluorescence pulse signals after the sampling respectively; $FITC_{true}$, $PE_{true}$, and $PerCP_{true}$ are true data after the fluorescence compensation; $OM_{ff}$ represents a spillover coefficient of a fluorescence pulse signal detected in an FITC detection channel and spilling into another FITC detection channel; $OM_{fp}$ represents a spillover coefficient of a fluorescence pulse signal detected on an FITC detection channel and spilling into a PE detection channel; $Mf_{pcp}$ represents a spillover coefficient of a fluorescence pulse signal detected on an FITC detection channel and spilling into a PcrCP detection channel; $OM_{pf}$ represents a spillover coefficient of a fluorescence pulse signal detected on a PE detection channel and spilling into an FITC detection channel; $OM_{pp}$ represents a spillover coefficient of a fluorescence pulse signal detected on a PE detection channel and spilling into another PE detection channel; $OM_{ppcp}$ represents a spillover coefficient of a fluorescence pulse signal detected on a PE detection channel and spilling into a Percp detection channel; $OM_{pcpf}$ represents a spillover coefficient of a fluorescence pulse signal detected on a PerCP detection channel and spilling into an FITC detection channel; $OM_{pcpp}$ represents a spillover coefficient of a fluorescence pulse signal detected on a PerCP detection channel and spilling into a PE detection channel; and $OM_{pcppcp}$ represents a spillover coefficient of a fluorescence pulse signal detected on a PerCP detection channel and spilling into another PerCP detection channel.

According to an embodiment of the present invention, after a median value of third fluorescence pulse data is obtained, a concentration value is calculated through multi-point calibration, and a calibration curve used is any one of cubic spline interpolation, four-parameter fitting, and double log.

According to another aspect, the present invention further provides an apparatus for analyzing flow matrix data, including: a data acquisition module, a fluorescence compensation module, an ellipse gate constructing module, an ellipse parameter obtaining module, a classification module, and a calibration module. The data acquisition module is configured to acquire and sample a forward-scattered light pulse signal outputted by a flow matrix analyzer and fluorescence pulse signals emitted by two classification fluoresceins used for microsphere classification and a calibration fluorescein; The fluorescence compensation module is configured to perform fluorescence compensation on three pieces of fluorescence pulse data after the sampling so as to obtain true data of each fluorescence pulse, and map true data of two classification fluorescence pulses to a scatter plot so as to form a two-dimensional array. The ellipse gate constructing module is configured to convert the two-dimensional array into a binary image, construct, based on a gathering region of each microsphere particle on the binary image, an ellipse gate related to the gathering region, and obtain intrinsic characteristics and movement characteristics of the ellipse gate, where the ellipse gate constructing module is specifically configured to perform the following steps: segmenting the formed binary image to obtain a connection domain in which each microsphere particle gathers; obtaining a relevant ellipse gate parameter based on an edge of the connection domain; and inversely converting the obtained ellipse gate parameter of each microsphere particle into a coordinate system corresponding to the two-dimensional array so as to obtain corresponding ellipse gate characteristics, where the ellipse gate characteristics include the intrinsic characteristic representing an ellipse gate size and the movement characteristic representing a transform from a standard position to the ellipse gate. The ellipse parameter obtaining module is configured to obtain coordinates of two focuses on the ellipse gate based on the intrinsic characteristics and movement characteristics of each ellipse gate. The classification module is configured to obtain the true data of two classification fluorescence pulses acquired on each microsphere particle so as to form coordinates of the microsphere particle, and compare a relationship between distances from coordinates of each microsphere particle to the two focuses on each ellipse gate and a major axis of the ellipse gate so as to classify the microsphere particle into a corresponding ellipse gate. The calibration module is configured to calculate a median value of true data of calibration fluorescence pulses on all microsphere particles within each ellipse gate for calibration or qualification.

According to an embodiment of the present invention, the obtaining, by the ellipse gate constructing module, a relevant ellipse gate parameter based on an edge of the connection domain includes:

constructing a minimum bounding rectangle of the connection domain based on a boundary of the connection domain, and obtaining coordinates of a center point of the minimum bounding rectangle and a deflection angle of the bounding rectangle with respect to a binary image abscissa; and determining an inscribed ellipse of the minimum bounding rectangle based on the deflection angle and coordinates of the center point of the minimum bounding rectangle, and obtaining corresponding ellipse parameters, where the ellipse parameters include coordinates of a center point of the ellipse, coordinates of a boundary point on a major axis of the ellipse, coordinates of a boundary point on a minor axis of the ellipse, and a deflection angle of the major axis of the ellipse with respect to a binary image abscissa.

According to an embodiment of the present invention, when gathering regions of various microsphere particles are regularly arranged in rows or columns, the segmenting, by the ellipse gate constructing module, the formed binary image to obtain a connection domain in which each microsphere particle gathers includes:

projecting the binary image along a direction perpendicular to coordinate axes so as to form a one-dimensional projection histogram;

performing gaussian smoothing on the one-dimensional projection histogram, and calculating a trough position of each histogram;

performing segmentation based on the trough position so as to obtain a row gathering block or a column gathering block;

establishing a structural element so as to expand and corrode each row gathering block or column gathering block a plurality of times; and determining, based on a spacing between pixels, the connection domain in which each microsphere particle gathers after the corrosion, and removing interference.

According to an embodiment of the present invention, the apparatus for analyzing flow matrix data further includes a binary gate determining module, where the binary gate determining module is configured to display data of the sampled forward-scattered light pulse signal in a form of histogram, and determine, based on a preset binary gate related to a microsphere size, whether a forward-scattered light pulse is located inside the binary gate; and perform the fluorescence compensation if the forward-scattered light pulse is located inside the binary gate.

According to another aspect of the present invention, a computer device is also provided, including a memory, a processor, and a computer program stored on the memory and capable of running on the processor, where when executing the computer program, the processor performs steps of the foregoing method for analyzing flow matrix data.

In summary, in the method for analyzing flow matrix data provided by the present invention, after the two-dimensional array is formed by mapping the true data of the two classification fluorescence pulses, the two-dimensional array is converted to the binary image. The ellipse gate is constructed automatically based on the gathering region of each microsphere particle on the binary image, and coordinates of the two focuses of the ellipse gate are obtained based on the intrinsic characteristics and movement characteristics of each ellipse gate. The microsphere particle is classified into a corresponding ellipse gate on the basis of distances between coordinates formed by true data of the two classification fluorescence pulses on each microsphere particle and the two focuses on each ellipse gate, thereby classifying and gathering the microsphere particles. The automatic establishment of the ellipse gate realizes the automation of flow matrix data analysis and the accuracy of the gate is high. The acquisition of focus coordinates based on the intrinsic characteristics and movement characteristics of the ellipse gate not only greatly simplifies the classification steps of microsphere particles, but also has high classification accuracy. Both provide the basis for accurate calculation on the light intensity of calibration fluoresceins, thereby greatly improving the accuracy of quantitative analysis or qualitative analysis of the concentration of the to-be-tested substance.

To make the above and other objectives, features and advantages of the present invention more comprehensible, preferred embodiments are described below in detail with accompanying drawings.

BRIEF DESCRIPTION OF DRAWINGS

FIG. 9(*b*) is a schematic structural diagram after expansion and corrosion on FIG. 9(*a*) a plurality of times. FIG. 9(*c*) is a schematic structural diagram after expansion and corrosion on FIG. 9(*b*) a plurality of times.

DETAILED DESCRIPTION OF THE INVENTION

Figure 1:
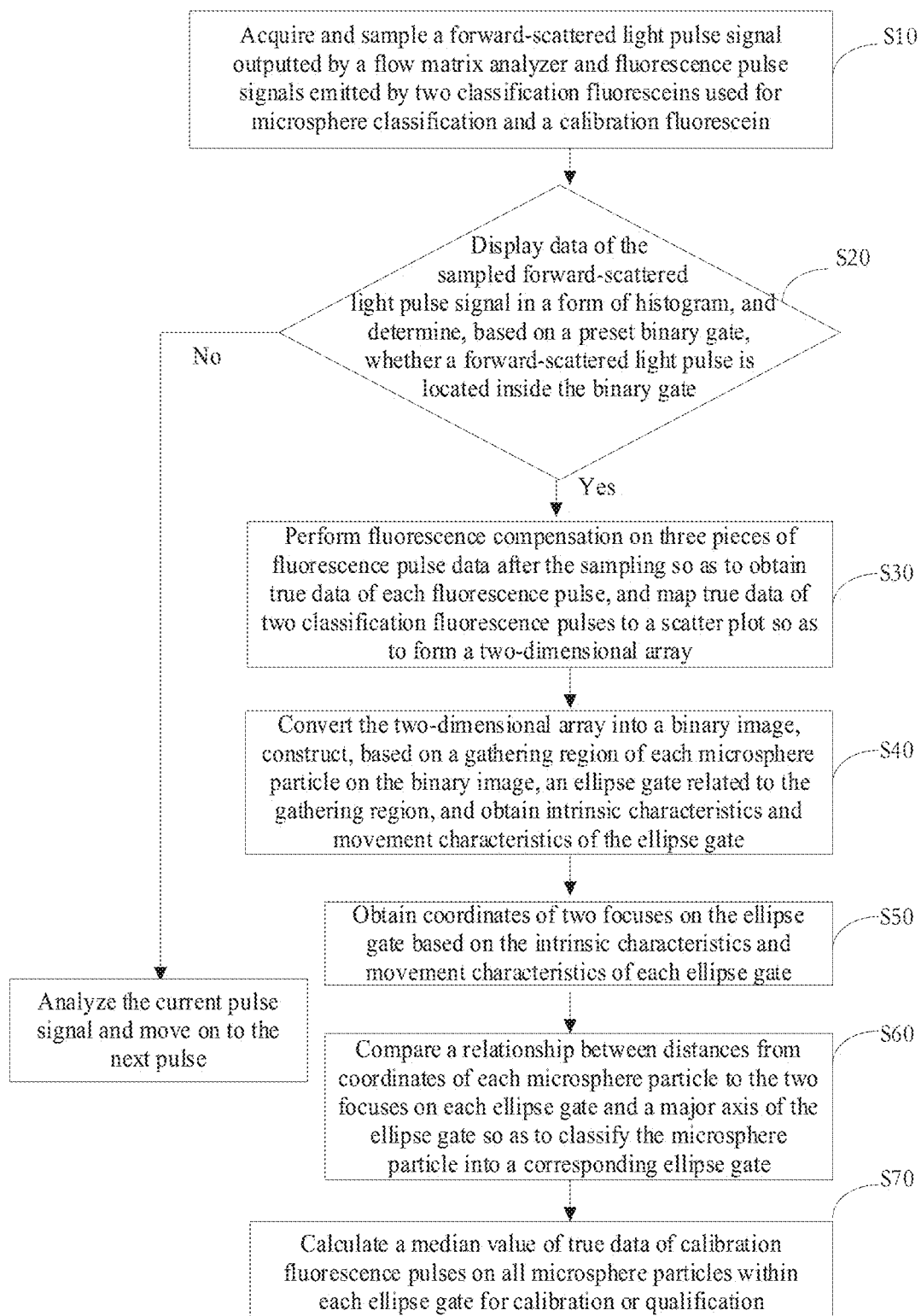
FIG. 1 is a schematic flowchart of a method for analyzing flow matrix data according to an embodiment of the present invention.

The flow matrix analyzer can enrich microsphere particles with the same fluorescence pulse signal characteristics and calibrate the concentration of the to-be-tested substance according to the fluorescence intensity on the microsphere particles, to implement multi-indicator high-throughput analysis. The specific working principle of the flow matrix analyzer is as follows: The fluorescently labeled microspheres react with the to-be-tested substance, and the sample suspension of the to-be-tested substance enters the suction tube, and then enters the flow chamber with the sheath fluid. The tubing before the sample suspension enters the flow chamber is tapered, forcing the sheath fluid to enter the flow chamber from all sides, with the sample in the center, and to flow in a straight line from one direction under the action of applied pressure. The sheath fluid fills the flow chamber to engulf the sample. When the two flow out through the nozzle of the flow chamber, the pressure forces the sheath fluid-wrapped droplet containing the microspheres to pass vertically through the detection zone. A laser is disposed at a position where the detection zone is perpendicular to the liquid drop, and a detector is disposed at a position opposite the laser. A beam of 480-nm laser is irradiated on the microspheres, and the fluorescently labeled microspheres emit scattered light and fluorescent emission waves under laser excitation, where the scattered light and emitted light are captured by the detector. After the interference is removed by performing optical filter and grating processing, the optical signal is converted and amplified by the light point and then inputted to the data processing module so as to obtain various parameters of the to-be-tested substance.

To implement the quantitative analysis on the parameters (for example, the concentration value) of the tested substance, this embodiment provides a method for analyzing flow matrix data, including the following steps:

Step S10: Acquire a forward-scattered light pulse signal of a flow matrix analyzer and fluorescence pulse signals emitted by two classification fluoresceins used for microsphere classification and a calibration fluorescein; and sample the acquired scattered light pulse signals and each fluorescence pulse signal so as to convert they into digital signals. Specifically, the photodiode or photomultiplier tube in the detector receives the light signal filtered by the optical filter and converts the light signal into an analog pulse signal, so as to form the forward-scattered light pulse signal and the fluorescence pulse signal of analog quantity. Afterwards, an analog-to-digital converter is used to convert the analog signal into digital forward-scattered light pulse data and fluorescence pulse data.

In this embodiment, three fluoresceins: FITC, PE, and PerCP, are selected for the flow matrix analyzer, where the two fluoresceins, FITC and PerCP, are selected to classify microspheres, and PE is used as the calibration fluorescein. FITC (Fluorescein) is further referred to as fluorescein isothiocyanate. Its labeled antibody is suitable for 488 nm argon ion laser and has the maximum emission wavelength of 525 nm. PE (R-Phycoerythrin) is further referred to as phycoerythrin. Its labeled antibody is suitable for 488 nm argon ion laser, and has the maximum emission wavelength of 575 nm. The antibody labeled by PerCP (Peridinin-Chlorophyll-Protein Complex) is suitable for 488 nm argon ion laser. In addition the maximum emission wavelength of PerCP is 677 nm.

Figure 2:
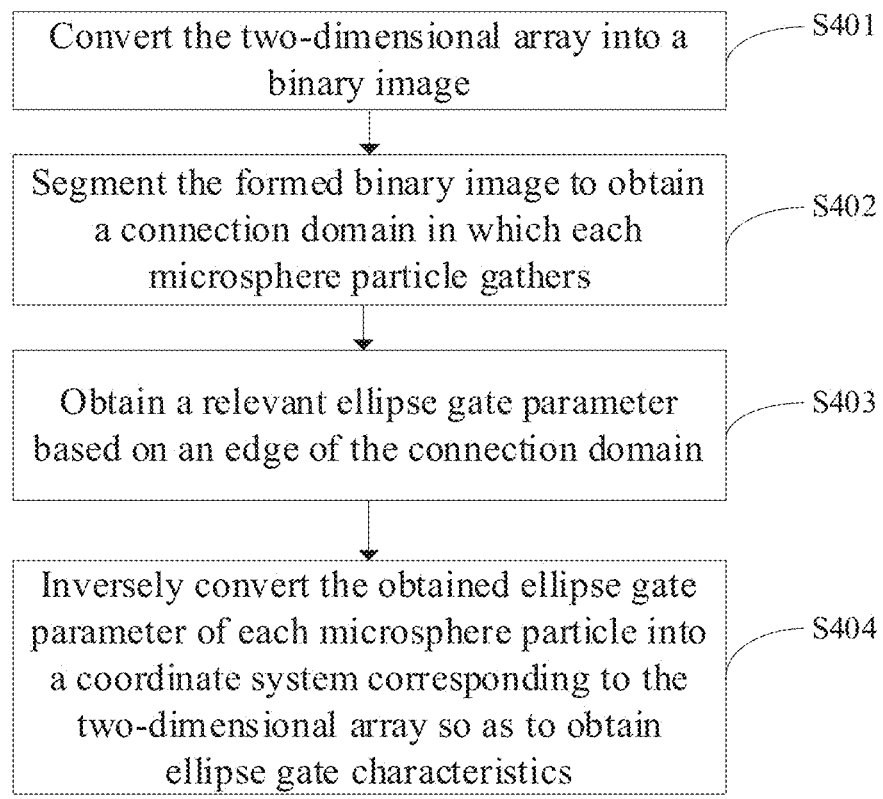
FIG. 2 is a schematic flowchart of step S40 in FIG. 1.

Forward scattered (FSC) light is the scattered light signal acquired in the forward direction, which can reflect the size of the microsphere. Therefore, after the data of the forward-scattered light pulse data is obtained, step S20 is performed: Display data of the sampled forward-scattered light pulse signal in a form of histogram, and determine, based on a preset binary gate related to a microsphere size, whether a forward-scattered light pulse is located inside the binary gate. A histogram is a statistical graphic that represents the distribution of data by vertical stripes or line segments at different heights. FIG. 2 is a histogram of forward-scattered light pulse data. In this figure, the abscissa represents the forward scattered light pulse intensity (FSC pulse intensity), A represents the integrated area, and the ordinate represents the count (count) of microsphere particles in the FSC pulse channel. After the forward-scattered light pulse histogram is formed, based on the preset lower limit L1 and upper limit L2 of the binary gate related to the microsphere size, it is determined whether the sampled forward-scattered light pulse data is within the binary gate, so as to remove noise and other distractions. The binary gate related to the microsphere size means that the pulse width between the lower limit L1 and the upper limit L2 is related to the microsphere size.

Figure 5:
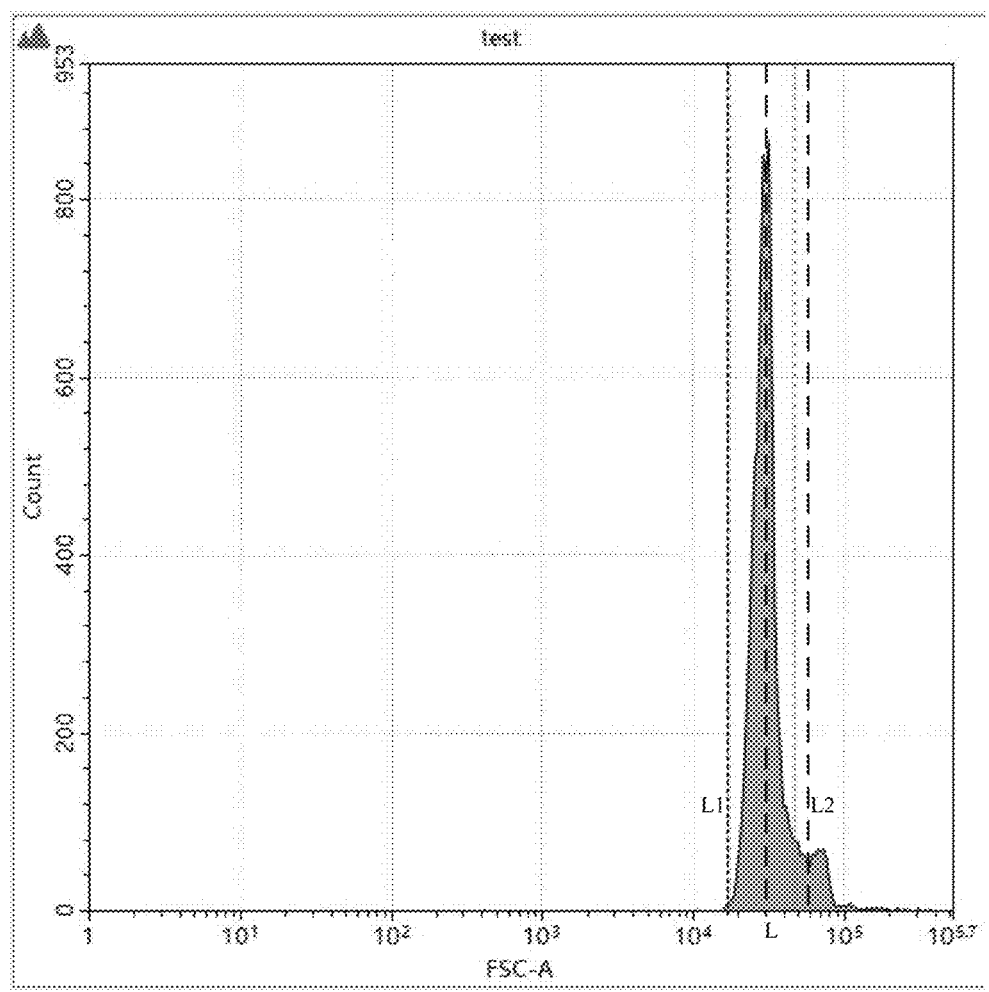
FIG. 5 is a schematic histogram of forward-scattered light pulse data.

In this embodiment, the channel coordinates corresponding to the peak value of the forward-scattered light pulse data in the histogram are obtained, and based on the peak coordinates and coordinates of the upper and lower limits of the binary gate, it is determined whether the forward scattered light pulse is located in the binary gate. Specifically, a digital detection method is used to perform peak detection on the sampled forward-scattered light pulse data. The detection algorithm may be a simple amplitude comparison method, or when the amount of superimposed noise is large, wavelet transform, Hilbert (Hilbert) transform, artificial neural network, filtering, interpolation, or fractal methods can be used for peak detection so as to improve the detection accuracy. However, this is not limited in the present invention. In other embodiments, after the forward scattered light pulse of analog quantity is obtained, an analog peak detection method may also be employed. For example, an analog peak hold circuit including a comparator is used for detection. L is used to represent the channel coordinates corresponding to the peak value on the histogram, and the relationships between the peak coordinates L and the lower limit coordinates L1 as well as upper limit coordinates L2 of the binary gate are compared so as to determine whether the forward scattered light pulse is within the binary gate. Specifically, as shown in FIG. 5, when L1≤L≤L2, it is determined that the currently detected forward-scattered light pulse data is within the binary gate.

When it is determined that the currently detected forward-scattered light pulse data is within the binary gate in step S20, it is indicated that the current pulse signal does not detect the microsphere particle corresponding to the binary gate, that is, the pulse is invalid, and there is no need for subsequent analysis. Therefore, the next forward scattered light pulse is to be analyzed in the subsequent process. The effective determining on the forward-scattered light pulse in the binary gate can effectively eliminate the interference of invalid detection and improve the speed of data analysis. However, it is not limited by the present invention whether step S20 is included. In another embodiment, the method for analyzing flow matrix data may not include step S20. In other words, step S30 is performed directly after step S10.

When it is determined that the currently detected forward-scattered light pulse data is within the binary gate in step S20, step S30 is performed: Perform fluorescence compensation on three pieces of fluorescence pulse data after the sampling so as to obtain true data of each fluorescence pulse, and map true data of two classification fluorescence pulses to a scatter plot so as to form a two-dimensional array.

Fluorescein absorbs light energy and emits light quanta (fluorescence) of a specific wavelength under the illumination of a wavelength (488 nm wavelength). After the fluorescence passes through the optical filter, different detectors are used to receive the fluorescence pulse signal. Since the fluorescence wavelength is normally distributed, it has a wide range. Some fluorescence pulse signals may appear in other detectors, and these signals are called fluorescence leakage. In this embodiment, two fluoresceins, FITC and PerCP, are used to classify the microspheres, and PE is used as the calibration fluorescein. Correspondingly, an FITC detector, a PerCP detector, and a PE detector are used to detect the fluorescence pulse signals emitted by the three fluoresceins respectively. Due to the fluorescence leakage, the FITC fluorescence pulse signal may partially present in the PE detector and PerCP detector. Similarly, the PE fluorescence pulse signal partially present in the FITC detector and PerCP detector. The PerCP fluorescence pulse signal may partially present in the FITC detector and PE detector. That is, the three fluorescence pulse signals interfere with each other, resulting in that the fluorescence pulse signal measured by the detector is not the real fluorescence pulse signal. Therefore, how other interfering fluorescence pulse signals are extracted from the fluorescence pulse signal in a detector requires fluorescence compensation.

Figure 3:
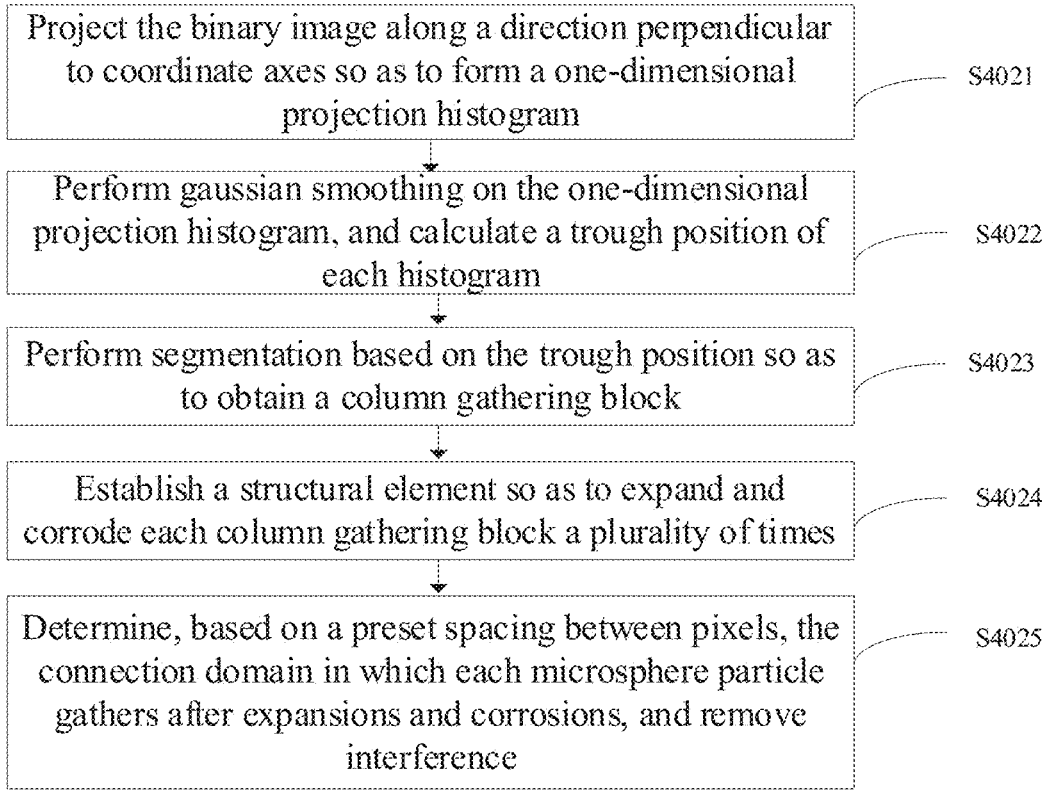
FIG. 3 is a schematic flowchart of step S402 in FIG. 2.
Figure 6:
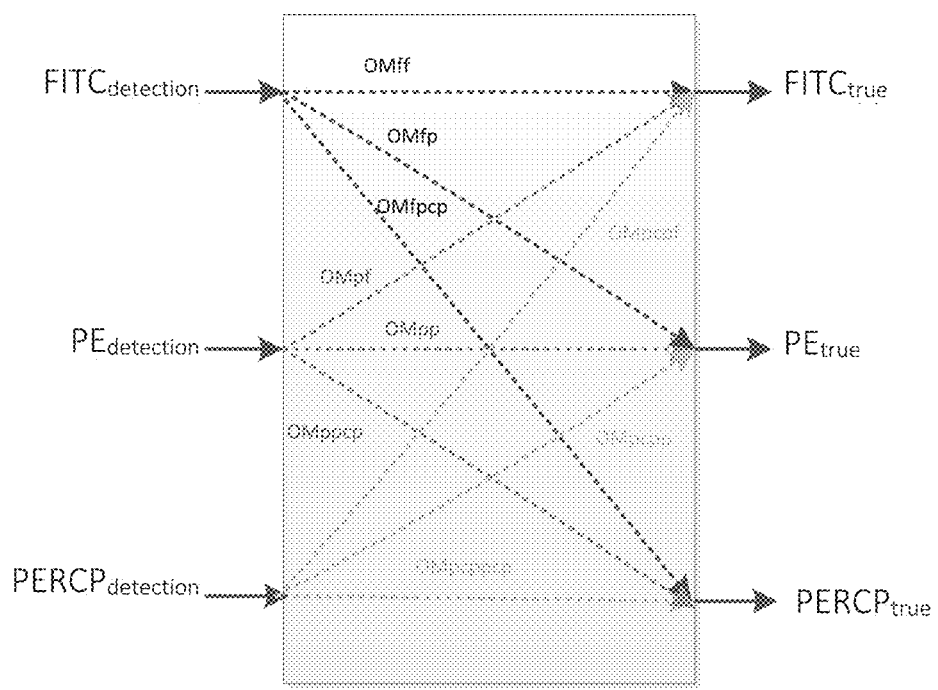
FIG. 6 is a schematic flowchart of fluorescence compensation.

In view of this, this embodiment provides a fluorescence compensation method, and a schematic flowchart of the compensation is shown in FIG. 3. The following can be obtained according to the schematic flowchart of FIG. 6:

$$FITC_{true} \times OM_{ff} + PE_{true} \times OM_{pf} + PERCP_{true} \times OM_{pcpf} = FITC_{detection}$$

$$FITC_{true} \times OM_{fp} + PE_{true} \times OM_{pp} + PERCP_{true} \times OM_{pcpp} = PE_{detection}$$

$$FITC_{true} \times OM_{fpcp} + PE_{true} \times OM_{ppcp} + PERCP_{true} \times OM_{pcppcp} = PERCP_{detection}.$$

The foregoing three expressions are shown in a unified form of matrix:

$$\begin{bmatrix} OM_{ff} & OM_{pf} & OM_{pcpf} \\ OM_{fp} & OM_{pp} & OM_{pcpp} \\ OM_{fpcp} & OM_{ppcp} & OM_{pcppcp} \end{bmatrix} \times \begin{bmatrix} FITC_{true} \\ PE_{true} \\ PERCP_{true} \end{bmatrix} = \begin{bmatrix} FITC_{detection} \\ PE_{detection} \\ PERCP_{detection} \end{bmatrix}.$$

After the matrix transformation, the true value are calculated by using the following formula:

$$\begin{bmatrix} FITC_{true} \\ PE_{true} \\ PERCP_{true} \end{bmatrix} = \left( \begin{bmatrix} OM_{ff} & OM_{fp} & OM_{fpcp} \\ OM_{pf} & OM_{pp} & OM_{ppcp} \\ OM_{pcpf} & OM_{pcpp} & OM_{pcppcp} \end{bmatrix}^T \right)^{-1} \times \begin{bmatrix} FITC_{detection} \\ PE_{detection} \\ PERCP_{detection} \end{bmatrix},$$

Formula 1 where
$FITC_{detection}$, $PE_{detection}$, and $PerCP_{detection}$ are data of the acquired fluorescence pulse signals after the sampling respectively; $FITC_{true}$, $PE_{true}$, and $PerCP_{true}$ are true data after the fluorescence compensation; $OM_{ff}$ represents a spillover coefficient of a fluorescence pulse signal detected in an FITC detection channel and spilling into another FITC detection channel; $OM_{fp}$ represents a spillover coefficient of a fluorescence pulse signal detected on an FITC detection channel and spilling into a PE detection channel; $Mf_{pcp}$ represents a spillover coefficient of a fluorescence pulse signal detected on an FITC detection channel and spilling into a PcrCP detection channel; $OM_{pf}$ represents a spillover coefficient of a fluorescence pulse signal detected on a PE detection channel and spilling into an FITC detection channel; $OM_{pp}$ represents a spillover coefficient of a fluorescence pulse signal detected on a PE detection channel and spilling into another PE detection channel; $OM_{ppcp}$ represents a spillover coefficient of a fluorescence pulse signal detected on a PE detection channel and spilling into a Percp detection channel; $OM_{pcpf}$ represents a spillover coefficient of a fluorescence pulse signal detected on a PerCP detection channel and spilling into an FITC detection channel; $OM_{pcpp}$ represents a spillover coefficient of a fluorescence pulse signal detected on a PerCP detection channel and spilling into a PE detection channel; and $OM_{pcppcp}$ represents a spillover coefficient of a fluorescence pulse signal detected on a PerCP detection channel and spilling into another PerCP detection channel.

Therefore, the fluorescence compensation being performed on the three fluorescence pulse data after the sampling includes the following steps:

Step S301: Obtain a preset fluorescence spillover matrix value as follows related to a selected fluorescein type and a detector:

$$\begin{bmatrix} & FITC & PE & PERCP \\ FITC & OM_{ff} & OM_{fp} & OM_{fpcp} \\ PE & OM_{pf} & OM_{pp} & OM_{ppcp} \\ PERCP & OM_{pcpf} & OM_{pcpp} & OM_{pcppcp} \end{bmatrix}.$$

Step S302: Calculate a fluorescence compensation array value as follows according to the spillover matrix value:

$$\left(\begin{bmatrix} OM_{ff} & OM_{fp} & OM_{fpcp} \\ OM_{pf} & OM_{pp} & OM_{ppcp} \\ OM_{pcpf} & OM_{pcpp} & OM_{pcppcp} \end{bmatrix}^T\right)^{-1}.$$

Step S303: Calculate the true value of the fluorescence pulse data after the compensation based on the forgoing fluorescence compensation formula (Formula 1).

Figure 4:
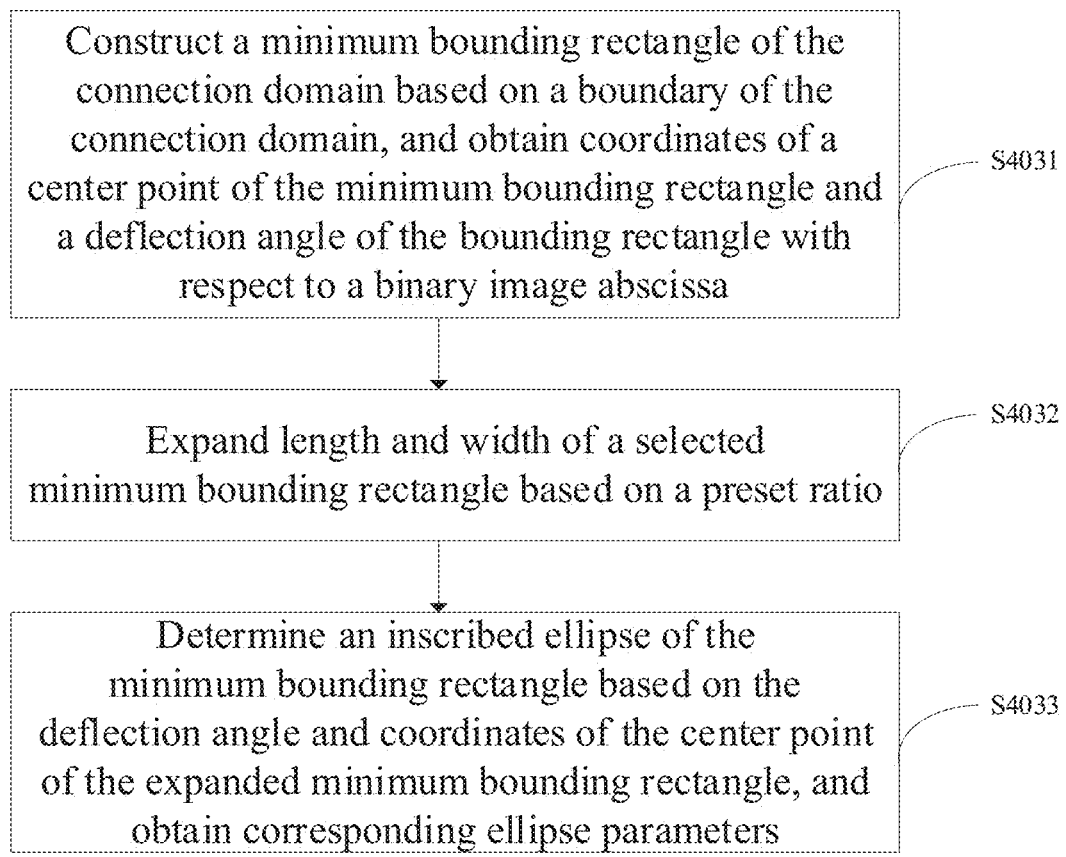
FIG. 4 is a schematic flowchart of step S403 in FIG. 2.

After the true data: $FITC_{true}$ and $PerCP_{true}$ of the two fluorescence pulses FITC and PerCP on the microsphere particles are obtained, $FITC_{true}$ and $PerCP_{true}$ are mapped onto a scatter plot to form a two-dimensional array. As shown in FIG. 4, the abscissa represents FITC fluorescence pulse channel, the ordinate represents PerCP fluorescence channel, and A represents the integral area.

The ellipse gate in the existing flow cytometry data analysis method is manually selected by the analyst by observing the gathering of various microspheres on the scatter plot. As a result, not only large labor costs are consumed, but also the size of the ellipse gate selected based on human subjectivity directly affects the accuracy of calibration. In view of this, this embodiment provides a method for analyzing flow matrix data. Through such method, ellipse gates for microsphere particles are automatically generated based on the two-dimensional array formed by the $FITC_{true}$ and the $PerCP_{true}$. As shown in FIG. 1, after the two-dimensional array is obtained based on $FITC_{true}$ and $PerCP_{true}$ in step S30, step S40 is performed: Convert the two-dimensional array into a binary image, construct, based on a gathering region of each microsphere particle on the binary image, an ellipse gate related to the gathering region, and obtain intrinsic characteristics and movement characteristics of the ellipse gate. Specifically, as shown in FIG. 2, step S40 includes the following steps:

Step S401: Convert the two-dimensional array into a binary image. Specifically, the two-dimensional array in step S30 is enlarged by, for example, 50 times. The maximum value max_x in the X direction and the maximum value max_y in the Y direction in the enlarged two-dimensional array are selected so as to produce a binary image of the size max_y×max_x, as shown in FIG. 3. The conversion from the two-dimensional array to the binary image is the conversion from data points to an image, and the ellipse gate is automatically generated based on the image. On the binary image, there may be multiple data points at the same coordinate point.

Figure 7:
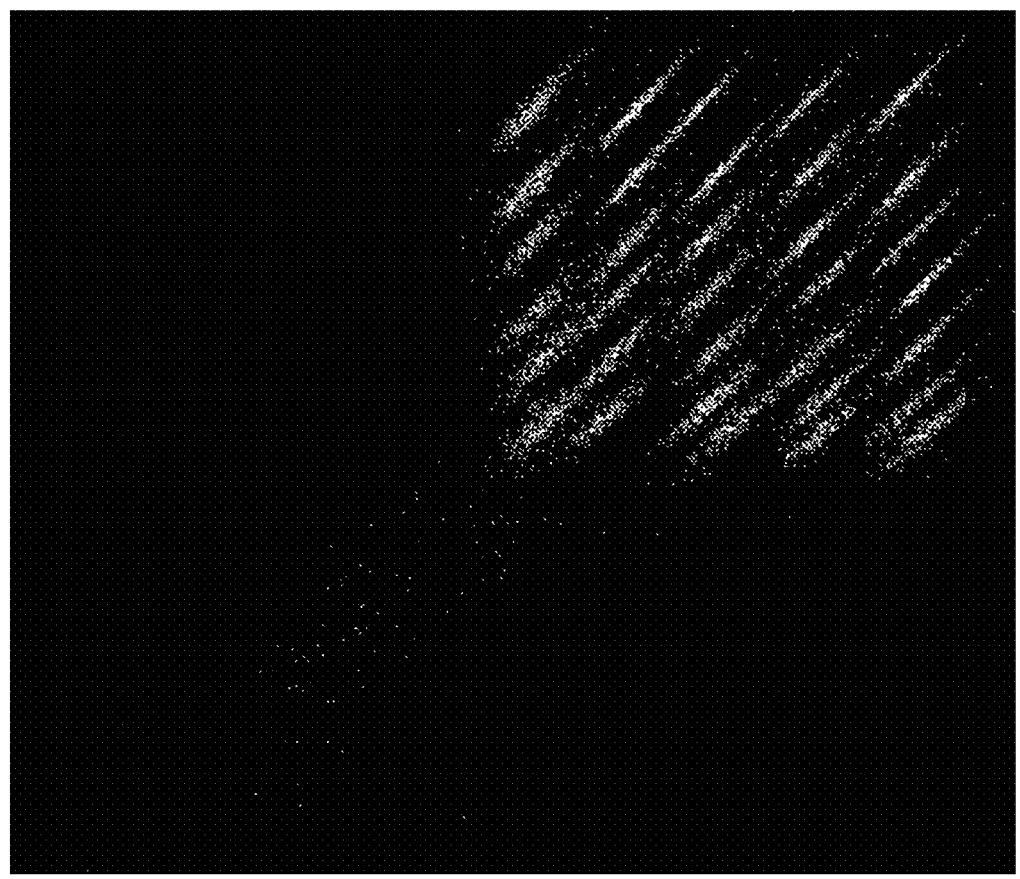
FIG. 7 is a schematic diagram of a binary image converted from a two-dimensional array.

Step S402: Segment the formed binary image to obtain a connection domain in which each microsphere particle gathers. As shown in FIG. 7, when gathering regions of various microsphere particles are regularly arranged in rows or columns, this embodiment provides a method for quickly segmenting the connection domain, which is specifically shown as follows:

Step 4021: Project the binary image along a direction perpendicular to coordinate axes so as to form a one-dimensional projection histogram. In this embodiment, in FIG. 8, projecting is performed along the direction perpendicular to the X-axis on the binary image to obtain a one-dimensional projection histogram. However, this is not limited in the present invention. In other embodiments, when the gathering region of various microsphere particles have specific rules in row arrangement, the binary image may further be projected along a direction perpendicular to the Y-axis to obtain a one-dimensional projection histogram.

Figure 8:
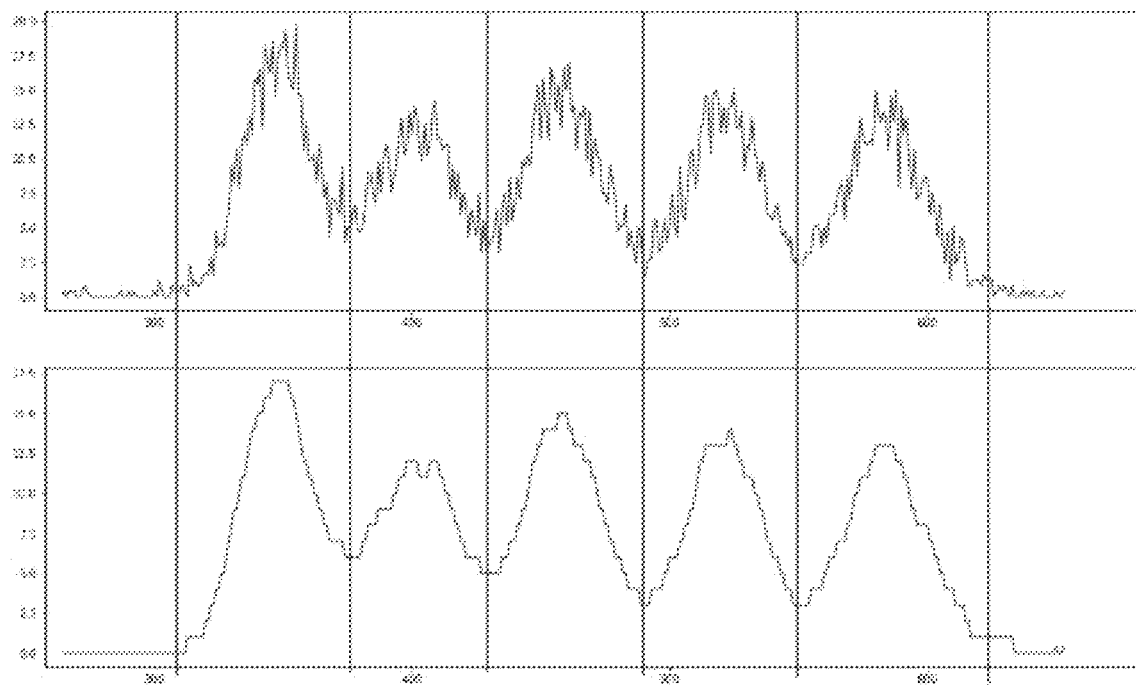
FIG. 8 is a schematic diagram of each trough position of a histogram after gaussian smoothing performed on a one-dimensional projection histogram.

Step 4022: Perform gaussian smoothing on the one-dimensional projection histogram, and calculate a trough position of each histogram, as shown in FIG. 8. Preferably, the window width of Gaussian smoothing is selected to be 9. However, this is not limited in the present invention.

Step 4023: Perform segmentation based on the trough position so as to obtain a row gathering block or a column gathering block, where FIG. 9 (a) is a first column gathering block in the binary image. In other embodiments, when the binary image is projected along the direction perpendicular to the Y-axis, a plurality of row gathering blocks are obtained through division based on the trough position.

Figures 9A, 9B, 9C:
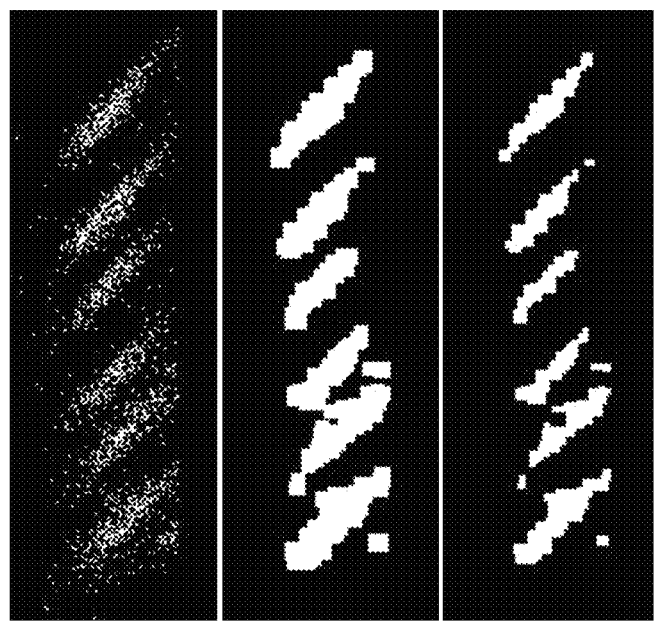
FIG. 9(*a*)-(*c*) are schematic structural diagrams of a column gathering block, wherein FIG. 9(*a*) is a schematic structural diagram of the column gathering block obtained through analysis on a trough position in FIG. 8.

Step 4024: Establish a structural element (5*5) so as to expand and corrode each column gathering block a plurality of times. FIG. 9(a) is a first column gathering block formed after segmentation; FIG. 9(b) is a schematic diagram of a structure after a plurality of expansions and corrosions; and FIG. 9(c) is a schematic diagram of the structure after a plurality of expansions and corrosions.

Step 4025: Determine, based on a preset spacing between pixels, the connection domain in which each microsphere particle gathers after expansions and corrosions, and remove interference. Specifically, if the spacing d between two adjacent pixels is greater than the preset distance do, it is indicated that the two pixels are not connected. In this way, the connection domain where each microsphere particle gathers is obtained and the interfering pixel near the connection domain is removed, which provides conditions for the accurate establishment of the ellipse gate in the subsequent steps.

In steps S4021 to S4023 in this embodiment, the binary image is divided into a plurality of column gathering blocks. In this way, the difficulty of determining the connection domain is reduced greatly, and when executing steps S4024 and S4025, the apparatus for analyzing flow matrix data can separately perform parallel synchronous analysis on multiple column gathering blocks by establishing multiple threads, thereby greatly increasing the rate of data analysis. However this is not limited in the present invention. In another embodiment, the binary image in step 4024 may further be expanded and corroded, and then the connection domain where each microsphere particle gathers is determined based on the preset spacing between pixels after erosion for segmentation. In addition, after the connection domain is determined, the abnormal detection can be determined by calculating the area of the connection domain. If the calculated connection domain area is much larger than the preset connection domain area threshold, for example, it is more than twice the preset connection domain area threshold, it can be determined that the current detection is abnormal. In this case, the inspector is reminded to examine the test results of the instrument.

Figure 10:
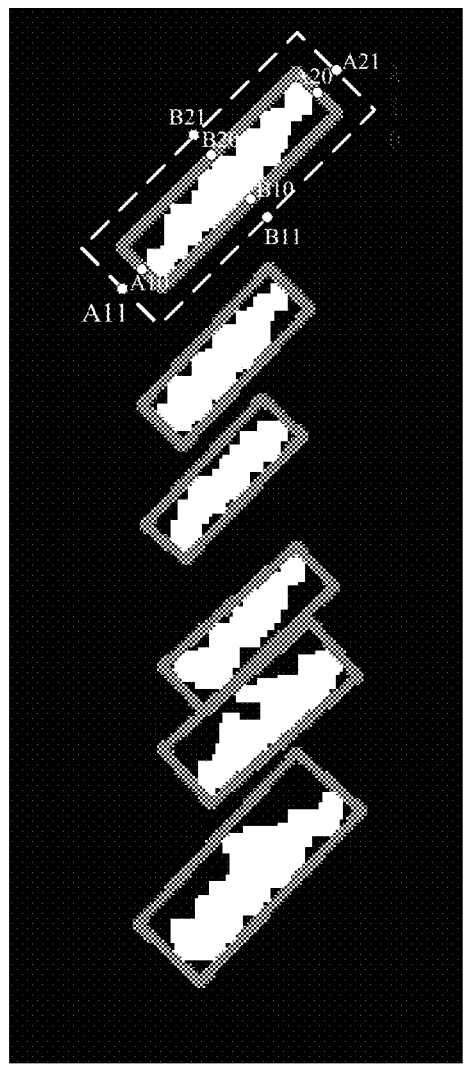
FIG. 10 is a schematic structural diagram of a minimum bounding rectangle constructed based on a connection domain.

After the connection domains where various microsphere particles gather are obtained in step S402, step S403 is performed: Obtain a relevant ellipse gate parameter based on an edge of the connection domain. This embodiment provides a specific implementation for this step, and the specific steps are as follows:

Step S4031: Construct a minimum bounding rectangle of the connection domain based on a boundary of the connection domain, and obtain coordinates of a center point of the minimum bounding rectangle and a deflection angle of the bounding rectangle with respect to a binary image abscissa. Specifically, as shown in FIG. 10, the two farthest coordinate points on the boundary of the connection domain are A10 and A20. The line between the two farthest coordinate points A10 and A20 is taken as a midline of short side of the minimum bounding rectangle. The distances between the boundary points of the connection domain are calculated sequentially in the direction perpendicular to the midline of the short side to obtain the two farthest coordinate points B10 and B20. The line between the two points B10 and B20 is taken as a midline of long side of the minimum bounding rectangle. The minimum bounding rectangle is determined based on the coordinate points A10, A20, B10, and B20, where the intersection point of the midline of long side and the midline of short side is the center point of the minimum bounding rectangle.

Step S4032: Expand length and width of a selected minimum bounding rectangle based on a preset ratio, where coordinate points at two ends of the midline of the short side of the expanded minimum bounding rectangle are A11 and A21; and coordinate points at two ends of the midline of the long side are B11 and B21.

Step S4033: Determine an inscribed ellipse of the minimum bounding rectangle based on the deflection angle and coordinates of the center point of the expanded minimum bounding rectangle, and obtain corresponding ellipse parameters, where the ellipse parameters include coordinates of a center point of the ellipse, coordinates of a boundary point on a major axis of the ellipse, coordinates of a boundary point on a minor axis of the ellipse, and a deflection angle of the ellipse with respect to a binary image abscissa. In this embodiment, the minimum bounding rectangle and the inscribed ellipse share the same center point. The two coordinate points A11 and A21 on the midline of the short side of the minimum bounding rectangle are the boundary points of the major axis of the inscribed ellipse, and the two coordinate points B11 and B21 on the midline of the corresponding long side are the boundary points of the minor axis of the inscribed ellipse. The angle between the midline of the short side and the abscissa on the binary image is the deflection angle of the ellipse with respect to the abscissa of the binary image. However, this is not limited in the present invention. In other embodiments, the corresponding inscribed ellipse parameters may also be directly calculated based on the minimum bounding rectangle.

Figure 11:
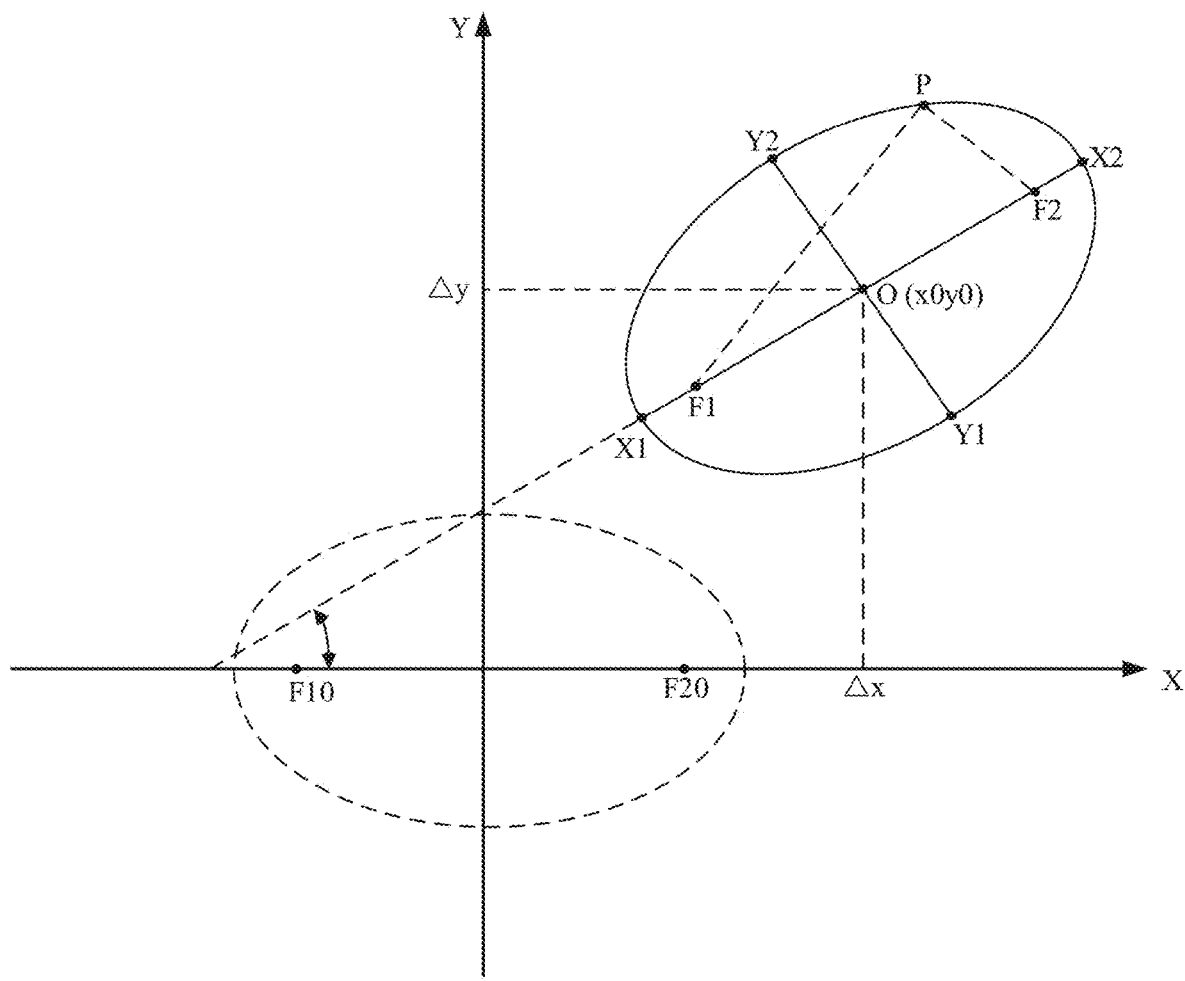
FIG. 11 is a schematic structural diagram of positions of two focuses of an ellipse gate obtained based on a constructed standard ellipse gate.

After the inscribed ellipse parameters are obtained, step S404 is performed: Inversely convert the obtained ellipse gate parameter of each microsphere particle into a coordinate system corresponding to the two-dimensional array so as to obtain corresponding ellipse gate characteristics, where the ellipse gate characteristics include the intrinsic characteristic representing an ellipse gate size and the movement characteristic representing a transform from a standard position to the ellipse gate. Specifically, in this embodiment, when the two-dimensional array is converted into a binary image in step S401, the data points are enlarged and transformed. Therefore, the parameters of the ellipse gate need to be inversely transformed to return to the two-dimensional array coordinate system, that is, the parameters of the ellipse gate need to be reduced by 50 times. After coordinate inverse conversion, the ellipse gate shown by the solid line in FIG. 11 has boundary points of the major axis: X1 and X2; boundary points of the minor axis: Y1 and Y2; coordinates of the center point O: (x0, y0); semi-major axis: a; and semi-minor axis: b. The movement characteristics of the ellipse refer to the movement characteristics of the transition from the standard position to the elliptical gate. The standard position refers to the position where the center point of the ellipse is at the coordinate origin and the focus is on the coordinate axis. The movement characteristics of the ellipse include the angle being $\theta$ between the major axis (the line between X1 and X2) and the abscissa and the translation vector from the coordinate origin to the center point O of the ellipse. In this embodiment, as shown in FIG. 11, the translation vector from the coordinate origin to the center point of the ellipse can be decomposed into the translation distance $\Delta x = D \cos \theta$ in the direction of the abscissa and the translation distance $\Delta y = D \sin \theta$ in the direction of the ordinate, where D is the linear distance from the center point O of the ellipse to the coordinate origin.

Step S50: Obtain coordinates of two focuses F1 and F2 on the ellipse gate based on the intrinsic characteristics and movement characteristics of each ellipse gate. Specifically, in this step, based on a semi-major axis a and a semi-minor axis b of the ellipse gate, a standard ellipse gate (the ellipse shown by the dotted line in FIG. 11) is constructed, where the standard ellipse gate corresponds to the ellipse gate and has a center point at the coordinate origin; and two focuses F10 and F20 of the standard ellipse gate are obtained. Then, the two focuses F10 and F20 of the standard ellipse gate are rotated by the angle $\theta$ in the movement characteristics. Taking the focus F10 of the standard ellipse as an example, if its initial position coordinates are ($x_{10}$, $y_{10}$), and the coordinates after rotating by the angle $\theta$ are ($x_1$, $y_1$), where the two satisfy the following relationship. Similarly, the coordinates ($x_{20}$, $y_{20}$) of the rotated focus F20 are ($x_2$, $y_2$).

$$[x_1 \ y_1 \ 1] = [x_{10} \ y_{10} \ 1] \times \begin{bmatrix} \cos\theta & -\sin\theta & 0 \\ \sin\theta & \cos\theta & 0 \\ 0 & 0 & 1 \end{bmatrix}$$

When the focus of the standard ellipse is on the X axis, the initial position of the focus F10 is ($x_{10}$, 0); and if the focus is on the Y axis, the initial position of the focus F10 is (0, $y_{10}$). The present invention does not make any limitation on this. The rotation angle remains unchanged in both cases, and only the rotation direction of the ellipse needs to be adjusted.

After coordinates ($x_1$, $y_1$) of focus F10 and coordinates ($x_2$, $y_2$) of F20 are obtained through rotation, according to the two components $\Delta x$ and $\Delta y$ of the translation vector of the translation vector from the coordinate origin to the center point of the ellipse, the rotated two focuses ($x_1$, $y_1$) and ($x_2$, $y_2$) are translated respectively to obtain the two focuses F1 and F2 of the ellipse gate. The coordinates of F1 are ($x_1+\Delta x$, $y_1+\Delta y$); and the coordinates of F2 are ($x_2+\Delta x$, $y_2+\Delta y$).

Step S60: Obtain the coordinates (x, y) formed by the true data after compensation on the two classification fluorescence pulses collected for each microsphere particle P, and calculate distances dDistance1, dDistance2 between the coordinates of the microsphere particle P and the two focuses F1 and F2 on each ellipse gate, where If dDistance1+dDistance2$\leq 2a_i$, it is indicated that the microsphere particle is located in the i-th ellipse gate, where $2a_i$ is the major axis length of the i-th ellipse gate. If the microsphere particles still cannot be classified after all the ellipse gates are traversed, the microsphere particle data is discarded and the next microsphere particle data is classified.

Figure 12:
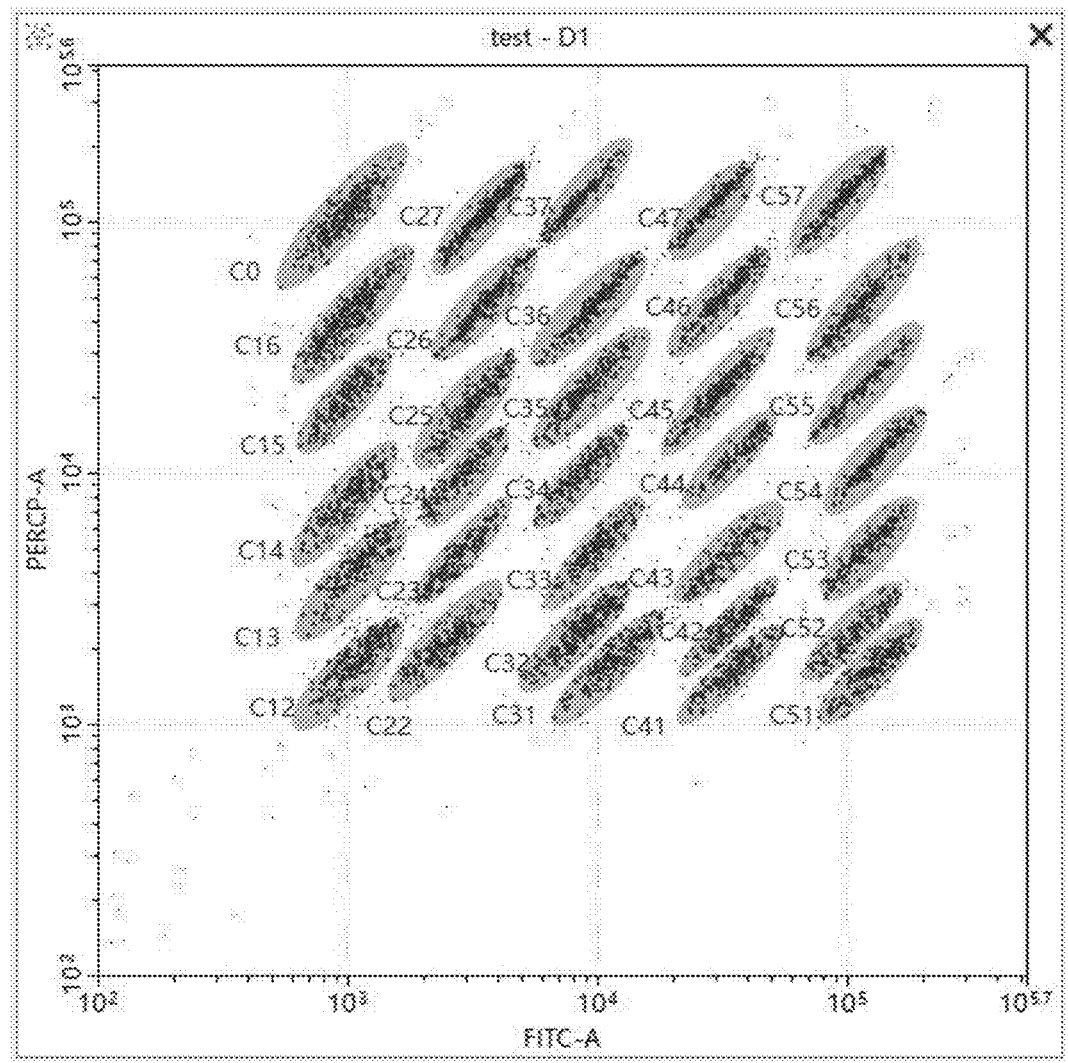
FIG. 12 is a schematic diagram of classification on various microsphere particles in a plurality of ellipse gates.

Based on the classification in step S60, microsphere particles of the same type are collected in the same ellipse gate, as shown in FIG. 12. The microsphere particles of different types are identified with different reference numbers (from C0 to C57) in FIG. 12. Therefore, in step S70, the PE median value of all microsphere particles in each ellipse gate are calculated for calibration so as to calculate the concentration value of the to-be-tested substance, thereby implementing quantitative analysis. When there are an odd number of microsphere particles, the PE median value refers to the middle one of true values of the PE fluorescence pulses in all microsphere particles of the ellipse gate after fluorescence compensation, where these true values are arranged from smallest to greatest or vice versa. If there are an even number of microsphere particles, the mean of two middle true values of PE fluorescence pulses is taken as the median value. Multi-point calibration method is used in calibration, and a calibration curve used is any one of cubic spline interpolation, four-parameter fitting, and double log. However, this is not limited in the present invention.

This embodiment is described by taking the quantitative analysis on the specific concentration value of the to-be-tested substance as an example. However, this is not limited in the present invention. In other embodiments, when qualitative analysis is required, negative or positive qualitative analysis can also be performed directly based on the PE median value of all microsphere particles in each ellipse gate.

Figure 13:
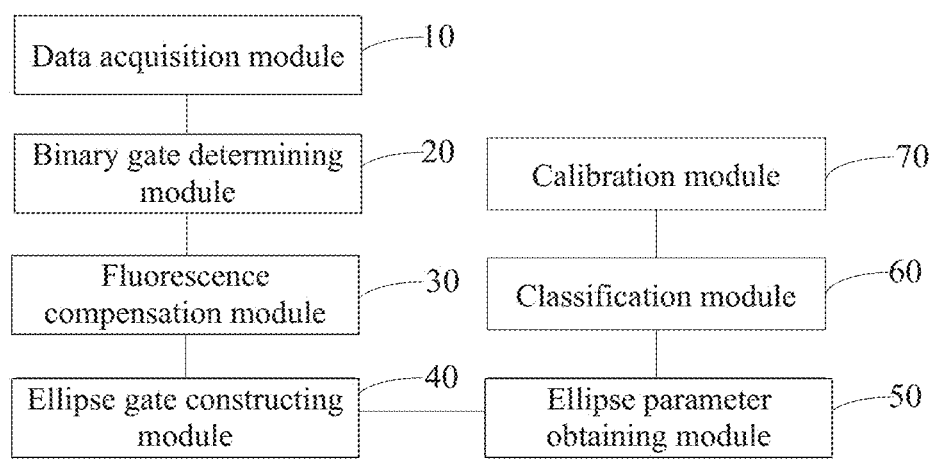
FIG. 13 is a schematic structural diagram of an apparatus for analyzing flow matrix data according to an embodiment of the present invention.

Corresponding to the method for analyzing flow matrix data, as shown in FIG. 13, this embodiment further provides an apparatus for analyzing flow matrix data, which includes: a data acquisition module 10, a binary gate determining module 20, a fluorescence compensation module 30, an ellipse gate constructing module 40, an ellipse parameter obtaining module 50, a classification module 60, and a calibration module 70. The data acquisition module 10 is configured to acquire and sample a forward-scattered light pulse signal outputted by a flow matrix analyzer and fluorescence pulse signals emitted by two classification fluoresceins used for microsphere classification and a calibration fluorescein. The binary gate determining module 20 is configured to display data of the sampled forward-scattered light pulse signal in a form of histogram, and determine, based on a preset binary gate related to a microsphere size, whether a forward-scattered light pulse is located inside the binary gate. If the binary gate determining module 20 determines that the forward-scattered light pulse is located inside the binary gate, the fluorescence compensation module 30 is configured to perform fluorescence compensation on three pieces of fluorescence pulse data after the sampling so as to obtain true data of each fluorescence pulse, and map true data of two classification fluorescence pulses to a scatter plot so as to form a two-dimensional array. The ellipse gate constructing module 40 is configured to convert the two-dimensional array into a binary image, construct, based on a gathering region of each microsphere particle on the binary image, an ellipse gate related to the gathering region, and obtain intrinsic characteristics and movement characteristics of the ellipse gate, where the ellipse gate constructing module is specifically configured to perform the following steps: segmenting the formed binary image to obtain a connection domain in which each microsphere particle gathers; obtaining a relevant ellipse gate parameter based on an edge of the connection domain; and inversely converting the obtained ellipse gate parameter of each microsphere particle into a coordinate system corresponding to the two-dimensional array so as to obtain corresponding ellipse gate characteristics, where the ellipse gate characteristics include the intrinsic characteristic representing an ellipse gate size and the movement characteristic representing a transform from a standard position to the ellipse gate. The ellipse parameter obtaining module 50 is configured to obtain coordinates of two focuses on the ellipse gate based on the intrinsic characteristics and movement characteristics of each ellipse gate. The classification module 60 is configured to obtain the true data of two classification fluorescence pulses acquired on each microsphere particle so as to form coordinates of the microsphere particle, and compare a relationship between distances from coordinates of each microsphere particle to the two focuses on each ellipse gate and a major axis of the ellipse gate so as to classify the microsphere particle into a corresponding ellipse gate. The calibration module 70 is configured to calculate a median value of true data of calibration fluorescence pulses on all microsphere particles within each ellipse gate for calibration or qualification.

In an embodiment of the present invention, the obtaining, by the ellipse gate constructing module 40, a relevant ellipse gate parameter based on an edge of the connection domain includes:
  constructing a minimum bounding rectangle of the connection domain based on a boundary of the connection domain, and obtaining coordinates of a center point of the minimum bounding rectangle and a deflection angle of the bounding rectangle with respect to a binary image abscissa; and
  determining an inscribed ellipse of the minimum bounding rectangle based on the deflection angle and coordinates of the center point of the minimum bounding rectangle, and obtaining corresponding ellipse parameters, where the ellipse parameters include coordinates of a center point of the ellipse, coordinates of a boundary point on a major axis of the ellipse, coordinates of a boundary point on a minor axis of the ellipse, and a deflection angle of the major axis of the ellipse with respect to a binary image abscissa.

In an embodiment of the present invention, when gathering regions of various microsphere particles are regularly arranged in rows or columns, the segmenting, by the ellipse gate constructing module, the formed binary image to obtain a connection domain in which each microsphere particle gathers includes:
  projecting the binary image along a direction perpendicular to coordinate axes so as to form a one-dimensional projection histogram;
  performing gaussian smoothing on the one-dimensional projection histogram, and calculating a trough position of each histogram;
  performing segmentation based on the trough position so as to obtain a row gathering block or a column gathering block;
  establishing a structural element so as to expand and corrode each row gathering block or column gathering block a plurality of times; and
  determining, based on a spacing between pixels, the connection domain in which each microsphere particle gathers after the corrosion, and removing interference.

For the functions and implementation process of each module in the apparatus, refer to the implementation process of step S10 to step S70 in the method for analyzing flow matrix data. Details are not repeated herein.

According to another aspect, this embodiment further provides a computer device, including a memory, a processor, and a computer program stored on the memory and capable of running on the processor, where when executing the computer program, the processor performs steps of the foregoing method for analyzing flow matrix data in this embodiment.

In summary, in the method for analyzing flow matrix data provided by the present invention, after the two-dimensional array is formed by mapping the true data of the two classification fluorescence pulses, the two-dimensional array is converted to the binary image. The ellipse gate is constructed automatically based on the gathering region of each microsphere particle on the binary image, and coordinates of the two focuses of the ellipse gate are obtained based on the intrinsic characteristics and movement characteristics of each ellipse gate. The microsphere particle is classified into a corresponding ellipse gate on the basis of distances between coordinates formed by true data of the two classification fluorescence pulses on each microsphere particle and the two focuses on each ellipse gate, thereby classifying and gathering the microsphere particles. The automatic establishment of the ellipse gate realizes the automation of flow matrix data analysis and the accuracy of the gate is high. The acquisition of focus coordinates based on the intrinsic characteristics and movement characteristics of the ellipse gate not only greatly simplifies the classification steps of microsphere particles, but also has high classification accuracy. Both provide the basis for accurate calculation on the light intensity of calibration fluoresceins, thereby greatly improving the accuracy of quantitative analysis or qualitative analysis of the concentration of the to-be-tested substance.

All patents and publications mentioned in the specification of the present invention indicate that these are disclosed techniques in the art and can be used in the present invention. All patents and publications cited herein are also incorporated by reference as if each publication was specifically and individually incorporated by reference. The present invention described herein may be practiced in the absence of any element or elements, limitation or limitations, no such limitation specifically stated herein. For example, the terms "containing", "essentially comprising" and "comprising" in each example herein may be replaced by either of the remaining two terms. The so-called "one" here only means "one kind", and it does not exclude that only one is included, and it may also mean that two or more are included. The terms and expressions used herein are by way of description, not limitation, and there is no intention here to indicate that these terms and interpretations described in this specification exclude any equivalent features, but it is understood that any suitable changes or modifications may be made within the scope of the invention and claims. It can be understood that the examples described in the present invention are all preferred embodiments and features, and any person of ordinary skill in the art can make some changes and changes according to the essence of the description of the present invention, and these changes and changes are also considered to belong to the scope of the present invention and the scope limited by the independent claims and the attached claims.

The invention claimed is:

1. A method for analyzing flow matrix data, comprising:
   emitting a beam on microsphere particles;
   acquiring and sampling a forward-scattered light pulse signal outputted by a flow matrix analyzer and fluorescence pulse signals emitted by two classification fluoresceins used for microsphere classification and a calibration fluorescein;
   performing fluorescence compensation on three pieces of fluorescence pulse data after the sampling so as to obtain true data of each fluorescence pulse, and mapping true data of two classification fluorescence pulses to a scatter plot so as to form a two-dimensional array;
   converting the two-dimensional array into a binary image, constructing, based on a gathering region of each microsphere particle on the binary image, an ellipse gate related to the gathering region, and obtaining intrinsic characteristics and movement characteristics of the ellipse gate, wherein this step comprises: segmenting the formed binary image to obtain a connection domain in which each microsphere particle gathers; obtaining a relevant ellipse gate parameter based on an edge of the connection domain; and inversely converting the obtained ellipse gate parameter of each microsphere particle into a coordinate system corresponding to the two-dimensional array so as to obtain corresponding ellipse gate characteristics, wherein the ellipse gate characteristics comprise the intrinsic characteristic representing an ellipse gate size and the movement characteristic representing a transform from a standard position to the ellipse gate;
   obtaining coordinates of two focuses on the ellipse gate based on the intrinsic characteristics and movement characteristics of each ellipse gate;
   obtaining the true data of two classification fluorescence pulses acquired on each microsphere particle so as to form coordinates of the microsphere particle, and comparing a relationship between distances from coordinates of each microsphere particle to the two focuses on each ellipse gate and a major axis of the ellipse gate so as to classify the microsphere particle into a corresponding ellipse gate; and
   calculating a median value of true data of calibration fluorescence pulses on all of the microsphere particles within each ellipse gate for calibration or qualification.

2. The method for analyzing flow matrix data according to claim 1, wherein the obtaining a relevant ellipse gate parameter based on an edge of the connection domain comprises:
   constructing a minimum bounding rectangle of the connection domain based on a boundary of the connection domain, and obtaining coordinates of a center point of the minimum bounding rectangle and a deflection angle of the bounding rectangle with respect to a binary image abscissa; and
   determining an inscribed ellipse of the minimum bounding rectangle based on the deflection angle and coordinates of the center point of the minimum bounding rectangle, and obtaining corresponding ellipse parameters, wherein the ellipse parameters comprise coordinates of a center point of the ellipse, coordinates of a boundary point on a major axis of the ellipse, coordinates of a boundary point on a minor axis of the ellipse, and a deflection angle of the major axis of the ellipse with respect to a binary image abscissa.

3. The method for analyzing flow matrix data according to claim 1, wherein when gathering regions of various microsphere particles are regularly arranged in rows or columns, the segmenting the formed binary image to obtain a connection domain in which each microsphere particle gathers comprises:

projecting the binary image along a direction perpendicular to coordinate axes so as to form a one-dimensional projection histogram;
performing gaussian smoothing on the one-dimensional projection histogram, and calculating a trough position of each histogram;
performing segmentation based on the trough position so as to obtain a row gathering block or a column gathering block;
establishing a structural element so as to expand and corrode each row gathering block or column gathering block a plurality of times; and
determining, based on a spacing between pixels, the connection domain in which each microsphere particle gathers after the corrosion, and removing interference.

4. The method for analyzing flow matrix data according to claim 1, wherein the segmenting the formed binary image to obtain a connection domain in which each microsphere particle gathers comprises:
establishing a structural element so as to expand and corrode the gathering regions of all microsphere particles on the binary image a plurality of times; and
determining, based on a spacing between pixels, the connection domain in which each microsphere particle gathers after the corrosion, and removing interference.

5. The method for analyzing flow matrix data according to claim 4, wherein after the connection domain of each microsphere particle is determined, a connection domain area is calculated and the connection domain area is compared with a preset connection-domain area threshold; and if the connection domain area is greater than twice the preset connection-domain area threshold, it is indicated that current detection is abnormal.

6. The method for analyzing flow matrix data according to claim 1, wherein before the fluorescence compensation, the method for analyzing flow matrix data further comprises:
displaying data of the sampled forward-scattered light pulse signal in a form of histogram, and determining, based on a preset binary gate related to a microsphere size, whether a forward-scattered light pulse is located inside the binary gate; and performing the fluorescence compensation if the forward-scattered light pulse is located inside the binary gate.

7. The method for analyzing flow matrix data according to claim 1, wherein the intrinsic characteristics of the ellipse gate comprise coordinates of a center point, a semi-major axis, and a semi-minor axis that are of the ellipse gate, and the movement characteristics of the ellipse gate comprise an angle being θ between a major axis and an abscissa as well as a translation vector from a coordinate origin to an ellipse center point; and
the obtaining coordinates of two focuses on the ellipse gate based on the intrinsic characteristics and movement characteristics of each ellipse gate comprises:
constructing, based on the semi-major axis and the semi-minor axis in the intrinsic characteristics of the ellipse gate, a standard ellipse gate, corresponding to the ellipse gate, whose center point is at the coordinate origin; and obtaining two focuses of the standard ellipse gate;
rotating the two focuses of the standard ellipse gate by the angle θ in the movement characteristics; and
translating the two rotated focuses based on a translation vector from the coordinate origin to the ellipse center point, to obtain the two focuses of the ellipse gate.

8. The method for analyzing flow matrix data according to claim 1, wherein the two fluoresceins used for microsphere classification are FITC and PerCP respectively, the calibration fluorescein is PE, and the performing fluorescence compensation on three pieces of fluorescence pulse data after sampling comprises:
obtaining a preset fluorescence spillover matrix value as follows related to a selected fluorescein type and a detector:

$$\begin{bmatrix} & FITC & PE & PERCP \\ FITC & OM_{ff} & OM_{fp} & OM_{fpcp} \\ PE & OM_{pf} & OM_{pp} & OM_{ppcp} \\ PERCP & OM_{pcpf} & OM_{pcpp} & OM_{pcppcp} \end{bmatrix}$$

calculating a fluorescence compensation array value as follows according to the spillover matrix value:

$$\left( \begin{bmatrix} OM_{ff} & OM_{fp} & OM_{fpcp} \\ OM_{pf} & OM_{pp} & OM_{ppcp} \\ OM_{pcpf} & OM_{pcpp} & OM_{pcppcp} \end{bmatrix}^T \right)^{-1}$$

and
calculating the true value of the fluorescence pulse data after the compensation based on the following fluorescence compensation formula:

$$\begin{bmatrix} FITC_{true} \\ PE_{true} \\ PERCP_{true} \end{bmatrix} = \left( \begin{bmatrix} OM_{ff} & OM_{fp} & OM_{fpcp} \\ OM_{pf} & OM_{pp} & OM_{ppcp} \\ oM_{pcpf} & OM_{pcpp} & OM_{pcppcp} \end{bmatrix}^T \right)^{-1} \times \begin{bmatrix} FITC_{detection} \\ PE_{detection} \\ PERCP_{detection} \end{bmatrix}$$

wherein $FITC_{detection}$, $PE_{detection}$, and PerCP detection are data of the acquired fluorescence pulse signals after the sampling respectively; $FITC_{true}$, $PE_{true}$, and $PerCP_{true}$ are true data after the fluorescence compensation; $OM_{ff}$ represents a spillover coefficient of a fluorescence pulse signal detected in an FITC detection channel and spilling into another FITC detection channel; $OM_{fp}$ represents a spillover coefficient of a fluorescence pulse signal detected on an FITC detection channel and spilling into a PE detection channel; $Mf_{pcp}$ represents a spillover coefficient of a fluorescence pulse signal detected on an FITC detection channel and spilling into a PcrCP detection channel; $OM_{pf}$ represents a spillover coefficient of a fluorescence pulse signal detected on a PE detection channel and spilling into an FITC detection channel; $OM_{pp}$ represents a spillover coefficient of a fluorescence pulse signal detected on a PE detection channel and spilling into another PE detection channel; $OM_{ppcp}$ represents a spillover coefficient of a fluorescence pulse signal detected on a PE detection channel and spilling into a Percp detection channel; $OM_{pcpf}$ represents a spillover coefficient of a fluorescence pulse signal detected on a PerCP detection channel and spilling into an FITC detection channel; $OM_{pcpp}$ represents a spillover coefficient of a fluorescence pulse signal detected on a PerCP detection channel and spilling into a PE detection channel; and $OM_{pcppcp}$ represents a spillover coefficient of a fluorescence pulse signal detected on a PerCP detection channel and spilling into another PerCP detection channel.

9. The method for analyzing flow matrix data according to claim 1, wherein after a median value of third fluorescence pulse data is obtained, a concentration value is calculated through multi-point calibration, and a calibration curve used is any one of cubic spline interpolation, four-parameter fitting, and double log.

10. An apparatus for analyzing flow matrix data, comprising:
a laser that emits a beam on microsphere particles;
a data acquisition module configured to acquire and sample a forward-scattered light pulse signal outputted by a flow matrix analyzer and fluorescence pulse signals emitted by two classification fluoresceins used for microsphere classification and a calibration fluorescein;
a fluorescence compensation module configured to perform fluorescence compensation on three pieces of fluorescence pulse data after the sampling so as to obtain true data of each fluorescence pulse, and map true data of two classification fluorescence pulses to a scatter plot so as to form a two-dimensional array;
an ellipse gate constructing module configured to convert the two-dimensional array into a binary image, construct, based on a gathering region of each microsphere particle on the binary image, an ellipse gate related to the gathering region, and obtain intrinsic characteristics and movement characteristics of the ellipse gate, wherein the ellipse gate constructing module is specifically configured to perform the following steps: segmenting the formed binary image to obtain a connection domain in which each microsphere particle gathers; obtaining a relevant ellipse gate parameter based on an edge of the connection domain; and inversely converting the obtained ellipse gate parameter of each microsphere particle into a coordinate system corresponding to the two-dimensional array so as to obtain corresponding ellipse gate characteristics, wherein the ellipse gate characteristics comprise the intrinsic characteristic representing an ellipse gate size and the movement characteristic representing a transform from a standard position to the ellipse gate;
an ellipse parameter obtaining module configured to obtain coordinates of two focuses on the ellipse gate based on the intrinsic characteristics and movement characteristics of each ellipse gate;
a classification module configured to obtain the true data of two classification fluorescence pulses acquired on each microsphere particle so as to form coordinates of the microsphere particle, and compare a relationship between distances from coordinates of each microsphere particle to the two focuses on each ellipse gate and a major axis of the ellipse gate so as to classify the microsphere particle into a corresponding ellipse gate; and
a calibration module configured to calculate a median value of true data of calibration fluorescence pulses on all of the microsphere particles within each ellipse gate for calibration or qualification.

11. The apparatus for analyzing flow matrix data according to claim 10, wherein the obtaining, by the ellipse gate constructing module, a relevant ellipse gate parameter based on an edge of the connection domain comprises:
constructing a minimum bounding rectangle of the connection domain based on a boundary of the connection domain, and obtaining coordinates of a center point of the minimum bounding rectangle and a deflection angle of the bounding rectangle with respect to a binary image abscissa; and
determining an inscribed ellipse of the minimum bounding rectangle based on the deflection angle and coordinates of the center point of the minimum bounding rectangle, and obtaining corresponding ellipse parameters, wherein the ellipse parameters comprise coordinates of a center point of the ellipse, coordinates of a boundary point on a major axis of the ellipse, coordinates of a boundary point on a minor axis of the ellipse, and a deflection angle of the major axis of the ellipse with respect to a binary image abscissa.

12. The apparatus for analyzing flow matrix data according to claim 10, wherein when gathering regions of various microsphere particles are regularly arranged in rows or columns, the segmenting, by the ellipse gate constructing module, the formed binary image to obtain a connection domain in which each microsphere particle gathers comprises:
projecting the binary image along a direction perpendicular to coordinate axes so as to form a one-dimensional projection histogram;
performing gaussian smoothing on the one-dimensional projection histogram, and calculating a trough position of each histogram;
performing segmentation based on the trough position so as to obtain a row gathering block or a column gathering block;
establishing a structural element so as to expand and corrode each row gathering block or column gathering block a plurality of times; and
determining, based on a spacing between pixels, the connection domain in which each microsphere particle gathers after the corrosion, and removing interference.

13. The apparatus for analyzing flow matrix data according to claim 10, wherein the apparatus for analyzing flow matrix data further comprises a binary gate determining module, wherein the binary gate determining module is configured to display data of the sampled forward-scattered light pulse signal in a form of histogram, and determine, based on a preset binary gate related to a microsphere size, whether a forward-scattered light pulse is located inside the binary gate; and perform the fluorescence compensation if the forward-scattered light pulse is located inside the binary gate.

14. A computer device, comprising a memory, a processor, and a computer program stored on the memory and capable of running on the processor, wherein when executing the computer program, the processor performs a method for analyzing flow matrix data, and the method comprises:
emitting a beam on microsphere particles;
acquiring and sampling a forward-scattered light pulse signal outputted by a flow matrix analyzer and fluorescence pulse signals emitted by two classification fluoresceins used for microsphere classification and a calibration fluorescein;
performing fluorescence compensation on three pieces of fluorescence pulse data after the sampling so as to obtain true data of each fluorescence pulse, and mapping true data of two classification fluorescence pulses to a scatter plot so as to form a two-dimensional array;
converting the two-dimensional array into a binary image, constructing, based on a gathering region of each microsphere particle on the binary image, an ellipse gate related to the gathering region, and obtaining intrinsic characteristics and movement characteristics of the ellipse gate, wherein this step comprises: segmenting the formed binary image to obtain a connection domain in which each microsphere particle gathers; obtaining a relevant ellipse gate parameter based on an edge of the connection domain; and inversely converting the obtained ellipse gate parameter of each microsphere particle into a coordinate system corresponding to the two-dimensional array so as to obtain corresponding ellipse gate characteristics, wherein the ellipse gate characteristics comprise the intrinsic characteristic representing an ellipse gate size and the movement characteristic representing a transform from a standard position to the ellipse gate;

obtaining coordinates of two focuses on the ellipse gate based on the intrinsic characteristics and movement characteristics of each ellipse gate;

obtaining the true data of two classification fluorescence pulses acquired on each microsphere particle so as to form coordinates of the microsphere particle, and comparing a relationship between distances from coordinates of each microsphere particle to the two focuses on each ellipse gate and a major axis of the ellipse gate so as to classify the microsphere particle into a corresponding ellipse gate; and calculating a median value of true data of calibration fluorescence pulses on all of the microsphere particles within each ellipse gate for calibration or qualification.

15. The computer device according to claim 14, wherein the obtaining a relevant ellipse gate parameter based on an edge of the connection domain comprises:

constructing a minimum bounding rectangle of the connection domain based on a boundary of the connection domain, and obtaining coordinates of a center point of the minimum bounding rectangle and a deflection angle of the bounding rectangle with respect to a binary image abscissa; and determining an inscribed ellipse of the minimum bounding rectangle based on the deflection angle and coordinates of the center point of the minimum bounding rectangle, and obtaining corresponding ellipse parameters, wherein the ellipse parameters comprise coordinates of a center point of the ellipse, coordinates of a boundary point on a major axis of the ellipse, coordinates of a boundary point on a minor axis of the ellipse, and a deflection angle of the major axis of the ellipse with respect to a binary image abscissa.

16. The computer device according to claim 14, wherein when gathering regions of various microsphere particles are regularly arranged in rows or columns, the segmenting the formed binary image to obtain a connection domain in which each microsphere particle gathers comprises:

projecting the binary image along a direction perpendicular to coordinate axes so as to form a one-dimensional projection histogram;

performing gaussian smoothing on the one-dimensional projection histogram, and calculating a trough position of each histogram;

performing segmentation based on the trough position so as to obtain a row gathering block or a column gathering block;

establishing a structural element so as to expand and corrode each row gathering block or column gathering block a plurality of times; and determining, based on a spacing between pixels, the connection domain in which each microsphere particle gathers after the corrosion, and removing interference.

17. The computer device according to claim 14, wherein the segmenting the formed binary image to obtain a connection domain in which each microsphere particle gathers comprises:

establishing a structural element so as to expand and corrode the gathering regions of all microsphere particles on the binary image a plurality of times; and determining, based on a spacing between pixels, the connection domain in which each microsphere particle gathers after the corrosion, and removing interference.

18. The computer device according to claim 17, wherein after the connection domain of each microsphere particle is determined, a connection domain area is calculated and the connection domain area is compared with a preset connection-domain area threshold; and if the connection domain area is greater than twice the preset connection-domain area threshold, it is indicated that current detection is abnormal.

19. The computer device according to claim 14, wherein before the fluorescence compensation, the method for analyzing flow matrix data further comprises:

displaying data of the sampled forward-scattered light pulse signal in a form of histogram, and determining, based on a preset binary gate related to a microsphere size, whether a forward-scattered light pulse is located inside the binary gate; and performing the fluorescence compensation if the forward-scattered light pulse is located inside the binary gate.

20. The computer device according to claim 14, wherein the intrinsic characteristics of the ellipse gate comprise coordinates of a center point, a semi-major axis, and a semi-minor axis that are of the ellipse gate, and the movement characteristics of the ellipse gate comprise an angle being $\theta$ between a major axis and an abscissa as well as a translation vector from a coordinate origin to an ellipse center point; and the obtaining coordinates of two focuses on the ellipse gate based on the intrinsic characteristics and movement characteristics of each ellipse gate comprises:

constructing, based on the semi-major axis and the semi-minor axis in the intrinsic characteristics of the ellipse gate, a standard ellipse gate, corresponding to the ellipse gate, whose center point is at the coordinate origin; and obtaining two focuses of the standard ellipse gate;

rotating the two focuses of the standard ellipse gate by the angle $\theta$ in the movement characteristics; and translating the two rotated focuses based on a translation vector from the coordinate origin to the ellipse center point, to obtain the two focuses of the ellipse gate.

21. The computer device according to claim 14, wherein the two fluoresceins used for microsphere classification are FITC and PerCP respectively, the calibration fluorescein is PE, and the performing fluorescence compensation on three pieces of fluorescence pulse data after sampling comprises:

obtaining a preset fluorescence spillover matrix value as follows related to a selected fluorescein type and a detector:

$$\begin{bmatrix} & FITC & PE & PERCP \\ FITC & OM_{ff} & OM_{fp} & OM_{fpcp} \\ PE & OM_{pf} & OM_{pp} & OM_{ppcp} \\ PERCP & OM_{pcpf} & OM_{pcpp} & OM_{pcppcp} \end{bmatrix}$$

calculating a fluorescence compensation array value as follows according to the spillover matrix value:

$$\left( \begin{bmatrix} OM_{ff} & OM_{fp} & OM_{fpcp} \\ OM_{pf} & OM_{pp} & OM_{ppcp} \\ OM_{pcpf} & OM_{pcpp} & OM_{pcppcp} \end{bmatrix}^T \right)^{-1}$$

and
calculating the true value of the fluorescence pulse data after the compensation based on the following fluorescence compensation formula:

$$\begin{bmatrix} FITC_{true} \\ PE_{true} \\ PERCP_{true} \end{bmatrix} = \left( \begin{bmatrix} OM_{ff} & OM_{fp} & OM_{fpcp} \\ OM_{pf} & OM_{pp} & OM_{ppcp} \\ OM_{pcpf} & OM_{pcpp} & OM_{pcppcp} \end{bmatrix}^T \right)^{-1} \times \begin{bmatrix} FITC_{detection} \\ PE_{detection} \\ PERCP_{detection} \end{bmatrix}$$

wherein $FITC_{detection}$, $PE_{detection}$, and PerCP detection are data of the acquired fluorescence pulse signals after the sampling respectively; $FITC_{true}$, $PE_{true}$, and $PerCP_{true}$ are true data after the fluorescence compensation; $OM_{ff}$ represents a spillover coefficient of a fluorescence pulse signal detected in an FITC detection channel and spilling into another FITC detection channel; $OM_{fp}$ represents a spillover coefficient of a fluorescence pulse signal detected on an FITC detection channel and spilling into a PE detection channel; $Mf_{pcp}$ represents a spillover coefficient of a fluorescence pulse signal detected on an FITC detection channel and spilling into a PcrCP detection channel; $OM_{pf}$ represents a spillover coefficient of a fluorescence pulse signal detected on a PE detection channel and spilling into an FITC detection channel; $OM_{pp}$ represents a spillover coefficient of a fluorescence pulse signal detected on a PE detection channel and spilling into another PE detection channel; $OM_{ppcp}$ represents a spillover coefficient of a fluorescence pulse signal detected on a PE detection channel and spilling into a Percp detection channel; $OM_{pcpf}$ represents a spillover coefficient of a fluorescence pulse signal detected on a PerCP detection channel and spilling into an FITC detection channel; $OM_{pcpp}$ represents a spillover coefficient of a fluorescence pulse signal detected on a PerCP detection channel and spilling into a PE detection channel; and $OM_{pcppcp}$ represents a spillover coefficient of a fluorescence pulse signal detected on a PerCP detection channel and spilling into another PerCP detection channel.

\* \* \* \* \*